United States Patent
Xie et al.

(10) Patent No.: US 10,075,582 B2
(45) Date of Patent: Sep. 11, 2018

(54) TERMINAL CONTROL METHOD AND APPARATUS, AND TERMINAL

(71) Applicant: Huawei Device (Dongguan) Co., Ltd., Dongguan (CN)

(72) Inventors: Xiaojun Xie, Shenzhen (CN); Zuming Hong, Shenzhen (CN); Lei Wang, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 15/460,353

(22) Filed: Mar. 16, 2017

(65) Prior Publication Data

US 2017/0187865 A1    Jun. 29, 2017

Related U.S. Application Data

(63) Continuation of application No. 14/452,806, filed on Aug. 6, 2014, now abandoned, which is a (Continued)

(30) Foreign Application Priority Data

Apr. 17, 2012   (CN) .......................... 2012 1 0112165

(51) Int. Cl.
    *H04M 1/00*      (2006.01)
    *H04M 1/725*     (2006.01)

(52) U.S. Cl.
    CPC ..... *H04M 1/72569* (2013.01); *H04M 1/7258* (2013.01)

(58) Field of Classification Search
    CPC ............. G06F 11/1626; H04M 1/7258; H04M 1/72569
    See application file for complete search history.

(56) References Cited

U.S. PATENT DOCUMENTS

| 9,013,397 B2 | 4/2015 | Hiramoto |
|---|---|---|
| 2005/0130715 A1 | 6/2005 | Fujisawa |

(Continued)

FOREIGN PATENT DOCUMENTS

| CN | 1766819 A | 5/2006 |
|---|---|---|
| CN | 101631157 A | 1/2010 |

(Continued)

OTHER PUBLICATIONS

Machine Translation and Abstract of Chinese Publication No. CN102184011, Sep. 14, 2011, 18 pages.

(Continued)

*Primary Examiner* — Tuan Pham
(74) *Attorney, Agent, or Firm* — Conley Rose, P.C.

(57) ABSTRACT

A terminal control method and apparatus, and a terminal, where the method includes obtaining position distribution of a terminal held position on the terminal, and performing, according to a mapping relationship between position distribution and a terminal control operation, an operation corresponding to the position distribution in order to control the terminal. The apparatus includes a first obtaining module and a performing module. The terminal includes the apparatus according to an embodiment of the present disclosure. In the terminal control method and apparatus, and the terminal according to embodiments of the present disclosure, terminal information of a terminal is obtained, and therefore, intention of a user about controlling the terminal can be determined proactively, and a corresponding operation may be performed according to position distribution, thereby improving intelligence and automation levels of controlling a terminal, and improving user experience.

20 Claims, 22 Drawing Sheets

Related U.S. Application Data continuation of application No. PCT/CN2013/073708, filed on Apr. 3, 2013.

(56) References Cited

U.S. PATENT DOCUMENTS

| | | |
|---|---|---|
| 2006/0052109 A1 | 3/2006 | Ashman, Jr. et al. |
| 2006/0111093 A1 | 5/2006 | Shim et al. |
| 2008/0263568 A1 | 10/2008 | Kusuda et al. |
| 2009/0140863 A1 | 6/2009 | Liu et al. |
| 2010/0007618 A1 | 1/2010 | Park et al. |
| 2010/0035665 A1* | 2/2010 | Munson ............... G06F 1/1624 455/575.1 |
| 2010/0107069 A1 | 4/2010 | Shiga |
| 2010/0177037 A1 | 7/2010 | Kim et al. |
| 2011/0007095 A1* | 1/2011 | Fujimoto ............. G06F 1/1626 345/650 |
| 2011/0069024 A1 | 3/2011 | Kim |
| 2011/0234487 A1 | 9/2011 | Hiramoto |
| 2013/0154999 A1* | 6/2013 | Guard ................... G06F 3/0487 345/174 |
| 2014/0104172 A1 | 4/2014 | Li |
| 2014/0370933 A1 | 12/2014 | Xie et al. |

FOREIGN PATENT DOCUMENTS

| | | |
|---|---|---|
| CN | 101907921 A | 12/2010 |
| CN | 102184011 A | 9/2011 |
| CN | 102232211 A | 11/2011 |
| CN | 102246130 A | 11/2011 |
| CN | 102498674 A | 6/2012 |
| CN | 102662474 A | 9/2012 |
| EP | 1785854 A1 | 5/2007 |
| JP | 2004228767 A | 8/2004 |
| JP | 2006072466 A | 3/2006 |
| JP | 2006080946 A | 3/2006 |
| JP | 2006237672 A | 9/2006 |
| JP | 2010103721 A | 5/2010 |
| KR | 20060056446 A | 5/2006 |
| WO | 2010110613 A1 | 9/2010 |
| WO | 2011034310 A2 | 3/2011 |

OTHER PUBLICATIONS

Machine Translation and Abstract of Chinese Publication No. CN1766819, May 3, 2006, 6 pages.
Machine Translation and Abstract of Chinese Publication No. CN101907921, Dec. 8, 2010, 10 pages.
Machine Translation and Abstract of Japanese Publication No. JPA200680946, Mar. 23, 2006, 20 pages.
Machine Translation and Abstract of Japanese Publication No. JPA2006237672, Sep. 7, 2006, 39 pages.
Machine Translation and Abstract of Japanese Publication No. JPA2010103721, May 6, 2010, 47 pages.
Partial English Translation and Abstract of Japanese Patent Application No. JPA2006072466, Feb. 29, 2016, 45 pages.
Partial English Translation and Abstract of Chinese Patent Application No. CN102662474A, Sep. 1, 2014, 8 pages.
Foreign Communication From a Counterpart Application, European Application No. 13779018.4, Extended European Search Report dated Mar. 5, 2015, 6 pages.
Foreign Communication From a Counterpart Application, Japanese Application No. 2016-113310, Japanese Office Action dated Mar. 28, 2017, 4 pages.
Foreign Communication From a Counterpart Application, Japanese Application No. 2016-113310, English Translation of Japanese Office Action dated Mar. 28, 2017, 4 pages.
Foreign Communication From a Counterpart Application, Japanese Application No. 2015-504850, Japanese Notice of Allowance dated May 10, 2016, 3 pages.
Foreign Communication From a Counterpart Application, Chinese Application No. 201210112165.9, Chinese Search Report dated Jun. 22, 2014, 2 pages.
Foreign Communication From a Counterpart Application, Chinese Application No. 201210112165.9, Chinese Office Action dated Jul. 2, 2014, 12 pages.
Foreign Communication From a Counterpart Application, Japanese Application No. 2015-504850, Japanese Office Action dated Dec. 8, 2015, 4 pages.
Foreign Communication From a Counterpart Application, Japanese Application No. 2015-504850, English Translation of Japanese Office Action dated Dec. 8, 2015, 4 pages.
Foreign Communication From a Counterpart Application, European Application No. 13779018.4, European Office Action dated Jan. 13, 2016, 6 pages.
Foreign Communication From a Counterpart Application, PCT Application No. PCT/CN2013/073708, English Translation of International Search Report dated Jul. 11, 2013, 2 pages.
Foreign Communication From a Counterpart Application, PCT Application No. PCT/CN2013/073708, English Translation of Written Opinion dated Jul. 11, 2013, 11 pages.
Office Action dated Dec. 9, 2015, 20 pages, U.S. Appl. No. 14/452,806, filed Aug. 6, 2014.
Office Action dated May 6, 2016, 15 pages, U.S. Appl. No. 14/452,806, filed Aug. 6, 2014.
Office Action dated Sep. 16, 2016, 10 pages, U.S. Appl. No. 14/452,806, filed Aug. 6, 2014.

* cited by examiner

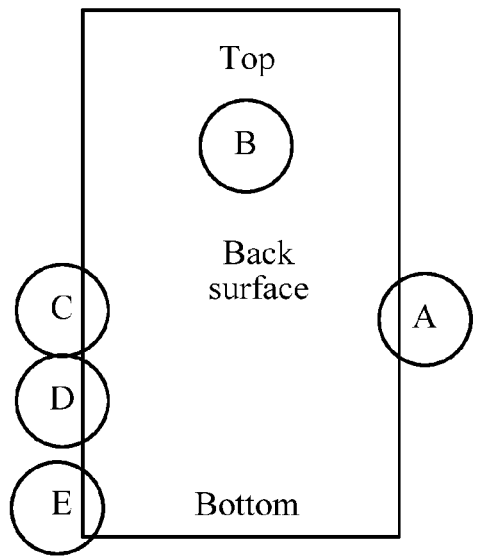
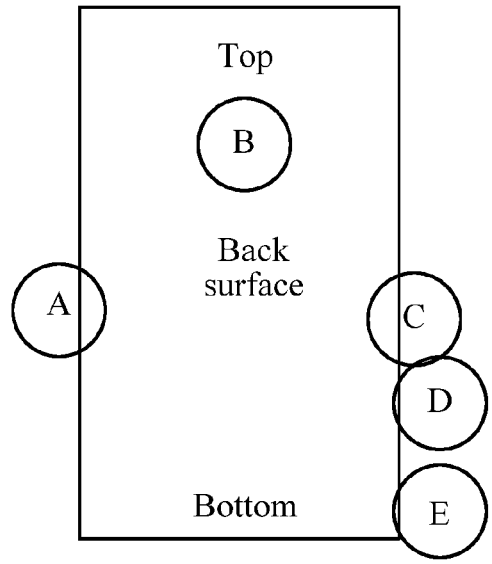
FIG. 3A FIG. 3B
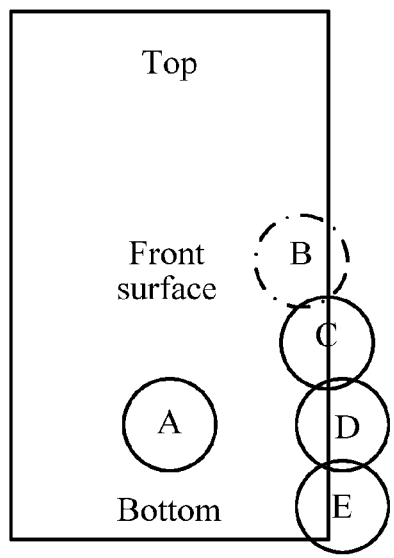
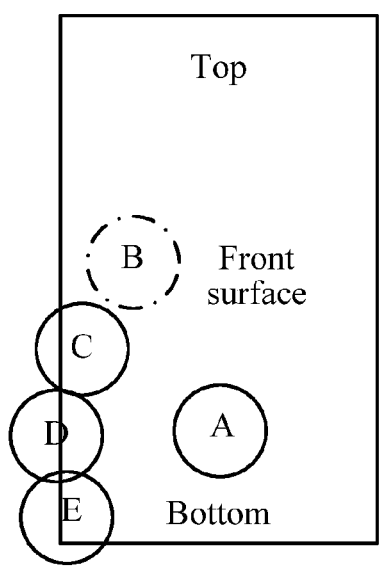
FIG. 4A FIG. 4B

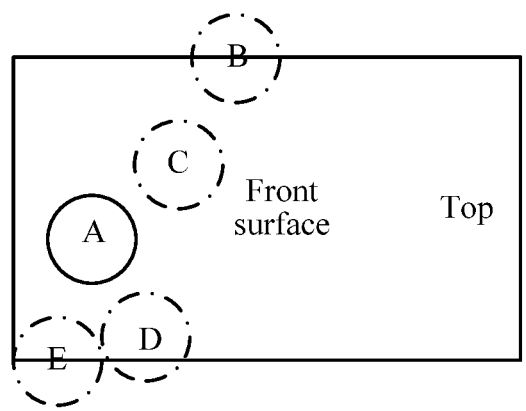
FIG. 4C
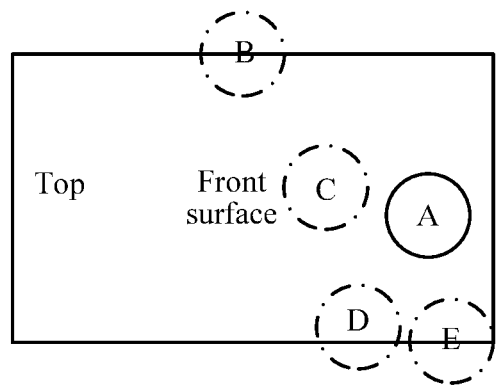
FIG. 4D
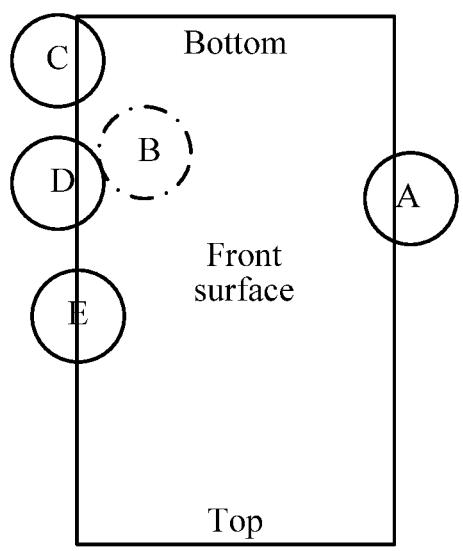    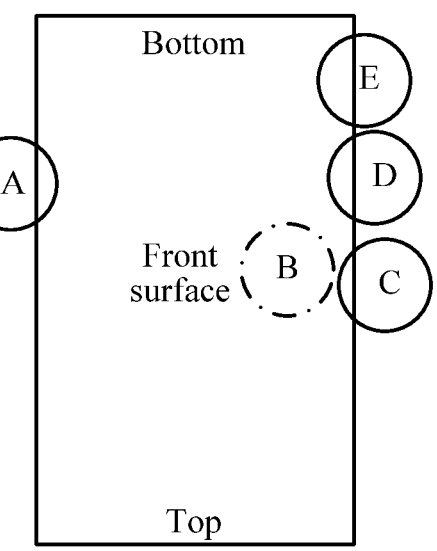
FIG. 5A                                FIG. 5B

400

430

US 10,075,582 B2

TERMINAL CONTROL METHOD AND APPARATUS, AND TERMINAL

CROSS-REFERENCE TO RELATED APPLICATION

This application is a continuation of U.S. patent application Ser. No. 14/452,806 filed on Aug. 6, 2014, which is a continuation of International Patent Application PCT/CN2013/073708 filed on Apr. 3, 2013, which claims priority to Chinese Patent Application No. 201210112165.9 filed on Apr. 17, 2012. All of the afore-mentioned patent applications are hereby incorporated by reference in their entireties.

TECHNICAL FIELD

The present disclosure relates to the field of communications, and in particular, to a terminal control method and apparatus, and a terminal in the field of communications.

BACKGROUND

Currently, there are many terminal control manners, for example, a manner of entering a control instruction using a keyboard, a manner of entering a control command using a touch screen and different gestures of touching, or a manner of inputting a voice in order to control a terminal. The manners for controlling a terminal have their respective characteristics, and bring great convenience to use by users.

However, in the foregoing manners for controlling a terminal, the terminal can perform a corresponding operation only after a user provides a specific operation instruction, and therefore, intelligence and automation levels of controlling a terminal are low, and user experience is poor.

SUMMARY

Embodiments of the present disclosure provide a terminal control method and apparatus, and a terminal, which can improve intelligence and automation levels of controlling a terminal, and improve user experience.

According to one aspect, an embodiment of the present disclosure provides a terminal control method, and the method includes obtaining position distribution of a terminal held position on a terminal, and performing, according to a mapping relationship between position distribution and a terminal control operation, an operation corresponding to the position distribution in order to control the terminal.

According to another aspect, an embodiment of the present disclosure provides a terminal control method, and the method includes obtaining position distribution of a terminal held position on the terminal and a terminal posture of the terminal, and performing, according to a mapping relationship between position distribution in combination with a terminal posture and a terminal control operation, an operation corresponding to the position distribution and the terminal posture in order to control the terminal.

According to still another aspect, an embodiment of the present disclosure provides a terminal control method, and the method includes obtaining position distribution of a terminal held position on a terminal, obtaining a current use status of the terminal, and performing, according to a mapping relationship between position distribution in combination with a use status and a terminal control operation, an operation corresponding to the position distribution and the use status in order to control the terminal.

According to still another aspect, an embodiment of the present disclosure provides a terminal control method, and the method includes obtaining position distribution of a terminal held position on a terminal and a terminal posture of the terminal, obtaining a current use status of the terminal, and performing, according to a mapping relationship between position distribution in combination with a terminal posture, a use status and a terminal control operation, an operation corresponding to the position distribution, the terminal posture and the use status in order to control the terminal.

According to still another aspect, an embodiment of the present disclosure provides a terminal control method, and the method includes prompting a user to collect terminal information corresponding to a terminal control operation, where the terminal information includes position distribution of a terminal held position on a terminal, or includes the position distribution and a terminal posture of the terminal, or includes the position distribution and a current use status of the terminal, or includes the position distribution, the terminal posture and the use status, determining that the user holds the terminal in a customary manner corresponding to the terminal control operation, recording the terminal information, and establishing, according to the terminal information, the mapping relationship between terminal information and a terminal control operation in order to control the terminal according to the mapping relationship.

According to still another aspect, an embodiment of the present disclosure provides a terminal control method, and the method includes obtaining terminal information of a terminal, where the terminal information includes position distribution of a terminal held position on the terminal, or includes the position distribution and a terminal posture of the terminal, or includes the position distribution and a current use status of the terminal, or includes the position distribution, the terminal posture and the use status, obtaining an operation performed by the terminal in the case of the terminal information when the terminal information does not match a mapping relationship between terminal information and a terminal control operation, and updating, according to the terminal information and the operation, the mapping relationship between the terminal information and the terminal control operation in order to control the terminal according to the mapping relationship.

According to still another aspect, an embodiment of the present disclosure provides a terminal control apparatus, and the apparatus includes a first obtaining module configured to obtain position distribution of a terminal held position on a terminal, and a performing module configured to perform, according to a mapping relationship between position distribution and a terminal control operation, an operation corresponding to the position distribution obtained by the first obtaining module in order to control the terminal.

According to still another aspect, an embodiment of the present disclosure provides an terminal control apparatus, and the apparatus includes a first obtaining module configured to obtain position distribution of a terminal held position on the terminal and a terminal posture of the terminal, and a performing module configured to perform, according to a mapping relationship between position distribution in combination with a terminal posture and a terminal control operation, an operation corresponding to the position distribution and the terminal posture that are obtained by the first obtaining module in order to control the terminal.

According to still another aspect, an embodiment of the present disclosure provides an terminal control apparatus, and the apparatus includes a first obtaining module configured to obtain position distribution of a terminal held position on a terminal, a second obtaining module configured to obtain a current use status of the terminal, and a performing module configured to perform, according to a mapping relationship between position distribution in combination with a use status and a terminal control operation, an operation corresponding to the position distribution obtained by the first obtaining module and the use status obtained by the second obtaining module in order to control the terminal.

According to still another aspect, an embodiment of the present disclosure provides an terminal control apparatus, and the apparatus includes a first obtaining module configured to obtain position distribution of a terminal held position on a terminal and a terminal posture of the terminal, a second obtaining module configured to obtain a current use status of the terminal, and a performing module configured to perform, according to a mapping relationship between position distribution in combination with a terminal posture, a use status and a terminal control operation, an operation corresponding to the position distribution and the terminal posture that are obtained by the first obtaining module and the use status obtained by the second obtaining module in order to control the terminal.

According to still another aspect, an embodiment of the present disclosure provides an terminal control apparatus, and the apparatus includes a prompting module configured to prompt a user to collect terminal information corresponding to a terminal control operation, where the terminal information includes position distribution of a terminal held position on a terminal, or includes the position distribution and a terminal posture of the terminal, or includes the position distribution and a current use status of the terminal, or includes the position distribution, the terminal posture and the use status, a determining module configured to determine that the user holds the terminal in a customary manner corresponding to the terminal control operation, a recording module configured to record the terminal information, and an establishing module configured to establish, according to the terminal information recorded by the recording module, the mapping relationship between terminal information and a terminal control operation in order to control the terminal according to the mapping relationship.

According to still another aspect, an embodiment of the present disclosure provides an terminal control apparatus, and the apparatus includes a first obtaining module configured to obtain terminal information of a terminal, where the terminal information includes position distribution of a terminal held position on the terminal, or includes the position distribution and a terminal posture of the terminal, or includes the position distribution and a current use status of the terminal, or includes the position distribution, the terminal posture and the use status, a second obtaining module configured to obtain an operation performed by the terminal in the case of the terminal information when the terminal information obtained by the first obtaining module does not match a mapping relationship between terminal information and a terminal control operation, and an updating module configured to update, according to the terminal information obtained by the first obtaining module and the operation obtained by the second obtaining module, the mapping relationship between the terminal information and the terminal control operation in order to control the terminal according to the mapping relationship.

According to still another aspect, an embodiment of the present disclosure provides a terminal, and the terminal includes the terminal control apparatus according to the embodiments of the present disclosure.

According to still another aspect, an embodiment of the present disclosure provides a terminal, and the terminal includes a sensor configured to obtain terminal information of a terminal, where the terminal information includes position distribution of a terminal held position on the terminal, or includes the position distribution and a terminal posture of the terminal, or includes the position distribution and a current use status of the terminal, or includes the position distribution, the terminal posture and the use status, a central processing unit (CPU) configured to perform, according to a mapping relationship between terminal information and a terminal control operation, an operation corresponding to the terminal information obtained by the sensor in order to control the terminal, and a power supply apparatus configured to supply power to the terminal.

Based on the foregoing technical solutions, in a terminal control method and apparatus and a terminal according to embodiments of the present disclosure, terminal information of a terminal is obtained, and therefore, intention of a user about controlling the terminal can be determined proactively, and a corresponding operation may be performed according to position distribution, thereby improving intelligence and automation levels of controlling a terminal, and improving user experience.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 3A and FIG. 3B are another schematic block diagrams showing a user holding a terminal using a left hand and using a right hand respectively;

FIG. 4A, FIG. 4B, FIG. 4C, and FIG. 4D are still another schematic block diagrams showing a user holding a terminal using a left hand and using a right hand respectively;

FIG. 5A and FIG. 5B are still another schematic block diagrams showing a user holding a terminal using a left hand and using a right hand respectively;

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, in the embodiments of the present disclosure, a terminal may include a user equipment (UE), the UE may be referred to as a mobile station (MS), a mobile terminal and the like, and the UE may communicate with one or more core networks using a radio access network (RAN). For example, the UE may be a mobile phone (or referred to as a "cellular" phone), a computer having a mobile terminal, and the like. For example, the UE may also be a portable, pocket, handheld, computer built-in or vehicular mobile apparatus, which exchanges voice and/or data with the radio access network.

It should be further understood that, the technical solutions of the embodiments of the present disclosure may further be applied to other various terminals, including a tablet computer, various audio/video players, various game consoles, and the like. For ease of description, the embodiments of the present disclosure use a mobile phone as an example, but the present disclosure is not limited thereto.

Figure 1:
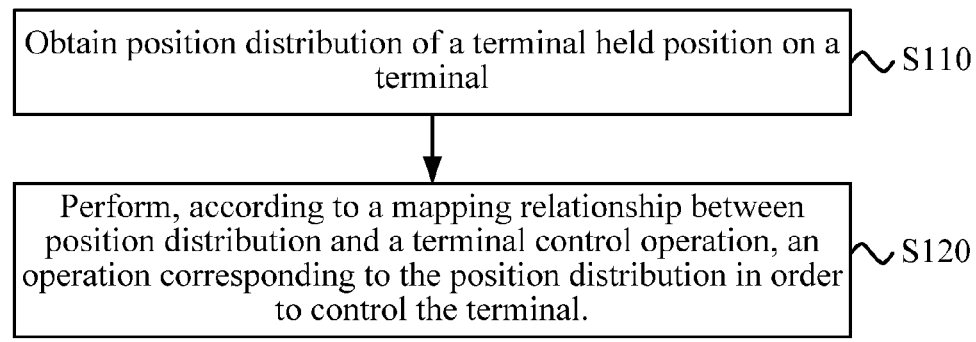
FIG. 1 is a schematic flowchart of a terminal control method according to an embodiment of the present disclosure.

FIG. 1 is a schematic flowchart of a terminal control method 100 according to an embodiment of the present disclosure. As shown in FIG. 1, the method 100 includes the following steps.

Step S110: Obtain position distribution of a terminal held position on a terminal.

Step S120: Perform, according to a mapping relationship between position distribution and a terminal control operation, an operation corresponding to the position distribution in order to control the terminal.

To control a terminal, for example, control the terminal to answer an incoming call, take a picture, call back, or the like, a terminal control apparatus may obtain distribution of positions, held by a user, of the terminal, that is, position distribution of a terminal held position on the terminal in order to perform, according to a mapping relationship between position distribution and a terminal control operation, an operation corresponding to the position distribution in order to control the terminal.

Therefore, in a terminal control method according to this embodiment of the present disclosure, position distribution of a terminal held position on a terminal is obtained, and therefore, intention of a user about controlling the terminal can be determined proactively, and a corresponding operation may be performed according to the position distribution, thereby improving intelligence and automation levels of controlling a terminal, and improving user experience.

In step S110, the terminal control apparatus obtains the position distribution of the terminal held position on the terminal. For example, the terminal control apparatus may obtain, based on a touch sensing technology and/or pressure sensing technology, the position distribution of the terminal held position on the terminal.

Further, for example, a large number of sensors are disposed on surfaces of the terminal, and the sensors may include one or more of sensors such as a resistive sensor, a capacitive sensor, an inductive sensor, a pressure sensor, and a piezoelectric sensor. When the user holds the terminal, the position distribution of the terminal held position on the terminal may be sensed or detected according to the touch sensing technology and/or pressure sensing technology.

When the user performs different terminal control operations, for example, when the user performs an operation such as browsing, calling, photographing, or keeping idle, the user may hold the terminal in different manners, and at this time, the position distribution of the terminal held positions on the terminal is different, that is, position distribution of a hand of the user on the terminal is different. Further, for example, when the user performs a call operation, the user may hold the terminal in a calling manner, and the position distribution of the terminal held position on the terminal may be call operation position distribution, when the user performs a photographing operation, the user may hold the terminal in a photographing manner, and the position distribution of the terminal held position on the terminal may be photographing operation position distribution.

Optionally, in this embodiment of the present disclosure, the position distribution includes browsing operation position distribution, call operation position distribution, photographing operation position distribution, idle operation position distribution or disposition operation position distribution.

In step S120, the terminal control apparatus performs, according to the mapping relationship between the position distribution and the terminal control operation, the operation corresponding to the position distribution in order to control the terminal.

As described above, when the user performs different terminal control operations, the position distribution of the terminal held positions on the terminal is different. Therefore, conversely, a terminal control operation that the user intends to perform may be determined using the position distribution of the terminal held position on the terminal and according to the mapping relationship between the position distribution and the terminal control operation, that is, the intention of the user about controlling the terminal may be determined proactively in order to perform a corresponding control operation according to the position distribution, thereby satisfying different use statuses.

For example, when the position distribution of the terminal held position on the terminal is the browsing operation position distribution, the terminal control apparatus may determine, according to the mapping relationship between the position distribution and the terminal control operation, that the user is intended to perform a browsing operation in order to perform the browsing operation. In this embodiment of the present disclosure, the mapping relationship between the position distribution and the terminal control operation may be stored in the terminal in advance, and the mapping relationship may also be established by the terminal control apparatus, which may be described in detail in the following, and is not repeated herein.

Therefore, in a terminal control method according to this embodiment of the present disclosure, position distribution of a terminal held position on a terminal is obtained, and therefore, intention of a user about controlling the terminal can be determined proactively, and a corresponding operation may be performed according to the position distribution, thereby improving intelligence and automation levels of controlling a terminal, and improving user experience.

It should be understood that, the touch sensing technology may also be referred to as a touch-sensitive technology, and a touch sensor adopting the touch sensing technology generally includes a resistive sensor, an inductive sensor, and a capacitive sensor. The touch sensor can provide a convenient control manner, and may be applied to controlling almost every type of devices. The touch sensor currently may provide some universal performance options and forms, for example, a slider and a proximity sensor. Development and progress of the touch sensor technology causes a sensor driver-type interface easier to implement, and therefore, the touch sensor technology is more easily applicable to various terminals. Currently, the commonly applied capacitive sensor works according to a detected capacitance change, that is, when a conductive object or human approaches or touches a conductive metal sheet of the capacitive sensor, capacitance between a finger and the metal sheet changes, and a control circuit can detect the change. Therefore, the touch sensor generally detects the capacitance change by measuring impedance of a circuit connected to a sensor pad, and accordingly determines whether a touch event occurs.

The pressure sensor measures pressure of liquid and gas. The pressure sensor is a sensor that converts pressure into an electrical signal and outputs the electrical signal, and is generally formed by an elastic sensitive element and a displacement sensitive element (or a strain meter). The elastic sensitive element functions to enable measured pressure to be applied to a certain area and converted into displacement or strain, and the displacement sensitive element or the strain meter converts the displacement or strain into an electric signal having a certain relationship with the pressure. Functions of the elastic sensitive element and the displacement sensitive element may also be integrated. The pressure sensor is a most commonly used sensor in industrial practice, the commonly used pressure sensor is manufactured mainly using a piezoelectric effect, and therefore, the sensor is also referred to as a piezoelectric sensor.

Position distribution cases of the terminal held positions on the terminal when the user performs different terminal control operations are described further below using controlling of a mobile phone as an example and with reference to the schematic block diagrams of a user holding a terminal shown in FIG. 2A to FIG. 6B.

In the schematic diagrams shown in FIG. 2A to FIG. 6B, a rectangular box represents a mobile phone, and A, B, C, D and E represents the thumb, the index finger, the middle finger, the ring finger and the little finger respectively. It should be understood that, in an actual application, position distribution of fingers of users on mobile phones may vary because of different appearances of mobile phones and different use habits of the users. However, this is only used as an example in this embodiment of the present disclosure for description, and is not intended to limit the present disclosure.

Figure 2A:
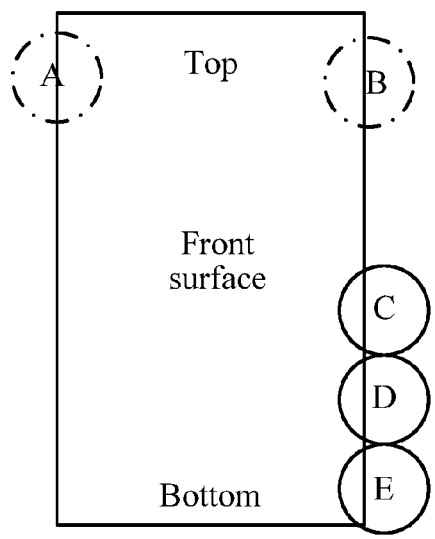
FIG. 2A and FIG. 2B are schematic block diagrams showing a user holding a terminal using a left hand and using a right hand respectively.
Figure 2B:
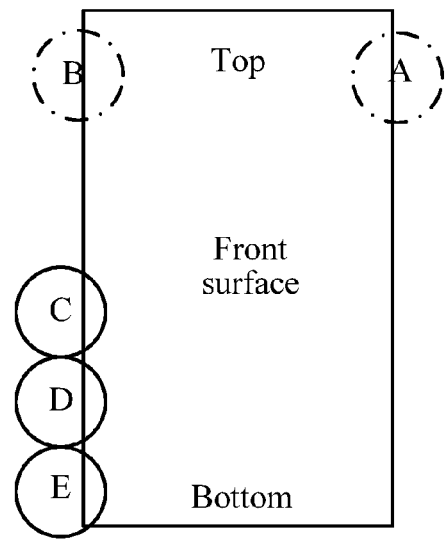

FIG. 2A and FIG. 2B are schematic diagrams showing a user holding a mobile phone using a left hand and using a right hand respectively. In FIG. 2A and FIG. 2B, the position distribution of the terminal held positions on the terminal includes that the middle finger C, the ring finger D and the little finger E of the user fasten the mobile phone, the thumb A and the index finger B are in an active state and are not used to fasten the mobile phone, and the terminal may have a certain angle of inclination. In this case, it may represent that the user is browsing mobile phone content, such as viewing a web page, reading a book or viewing information, that is, the position distribution shown in FIG. 2A and FIG. 2B may be referred to as the browsing operation position distribution. Therefore, when the terminal control apparatus obtains the position distribution of the terminal held position on the terminal, as shown in FIG. 2A or FIG. 2B, the apparatus may perform, according to the position distribution and based on the mapping relationship between the position distribution and the terminal control operation, a browsing operation corresponding to the position distribution in order to control the terminal.

As shown in FIG. 3A and FIG. 3B, the position distribution of the terminal held positions on the terminal includes that the thumb A, the middle finger C, the ring finger D and the little finger E move backwards to appear a loose grip state, and the index finger B is placed at the back of the terminal to serve as a support point. In this case, it represents that the terminal enters or is about to enter a call state, for example, making or answering a call. That is, the position distribution shown in FIG. 3A and FIG. 3B may be referred to as the call operation position distribution. To determine the call state, a proximity sensor on the terminal may further be used to determine whether the terminal enters the call state. For example, determining is performed according to a distance between the head and the mobile phone, and when the distance is less than a threshold, it may be determined that the mobile phone enters the call state, otherwise, the mobile phone is about to enter the call state.

FIG. 4A and FIG. 4B are schematic diagrams showing a user holding a mobile phone vertically using a left hand and using a right hand respectively, and FIG. 4C and FIG. 4D are schematic diagrams showing a user holding a mobile phone horizontally using a left hand and using a right hand respectively. In FIG. 4A to FIG. 4D, the user holds one end of the mobile phone away from a camera, generally a lower part of the mobile phone, in a manner that the thumb A is generally placed in the middle of the far-end on a front surface, and other four fingers B, C, D and E hold the mobile phone on the other surface. The whole mobile phone appears a vertical posture. In this case, it may represent that the terminal enters a photographing state. That is, the position distribution shown in FIG. 4A to FIG. 4D may be referred to as the photographing operation position distribution. Therefore, when the terminal control apparatus obtains the position distribution of the terminal held position on the terminal as that shown in any one of FIG. 4A to FIG. 4D, the apparatus may determine that the user intends to perform a photographing operation such that the apparatus may perform the photographing operation corresponding to the position distribution in order to control the terminal.

FIG. 5A and FIG. 5B are still other schematic block diagrams showing a user holding a terminal using a left hand and using a right hand respectively. In FIG. 5A or FIG. 5B, the user holds a mobile phone, and a phone body faces downwards and may be allowed to have a certain angle. In this case, the position distribution of the terminal held position may represent that the terminal enters an idle state, and the user only holds the mobile phone casually without paying attention to content shown on the mobile phone. That is, the position distributions shown in FIG. 5A and FIG. 5B may be referred to as the idle operation position distribution.

Figures 6A, 6B:
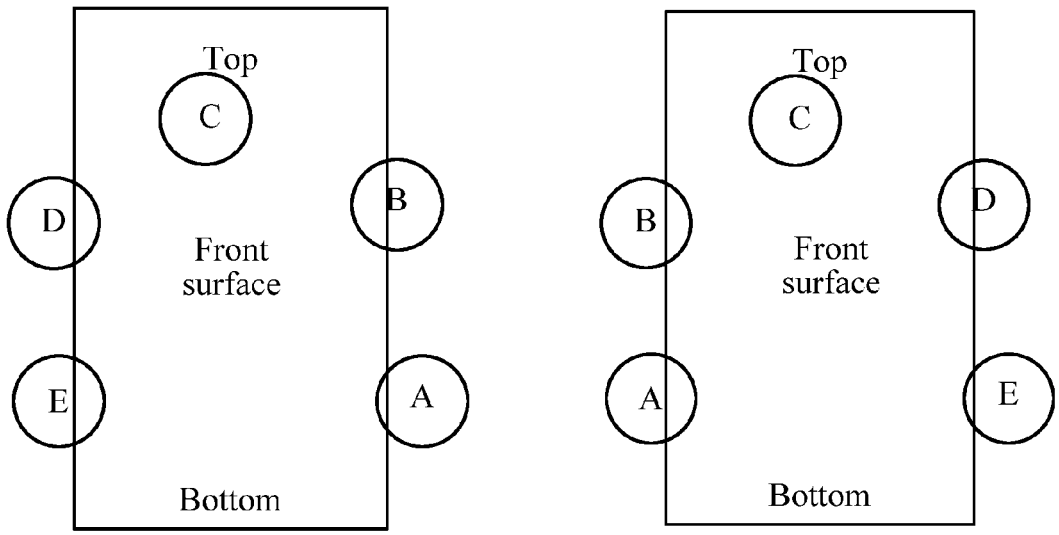
FIG. 6A and FIG. 6B are still another schematic block diagrams showing a user holding a terminal using a left hand and using a right hand respectively.

In FIG. 6A and FIG. 6B, a user holds a mobile phone in a manner that the palm faces a screen, the thumb A and the index finger B are located on one side of the mobile phone, the ring finger D and the little finger E are located on the other side of the mobile phone, and the middle finger C is located in an upper-middle portion of the mobile phone, that is, the whole hand of the user covers the screen. In this case, the position distribution of the terminal held position may represent that the terminal enters a disposition state, for example, the user may stop a certain program such as an alarm clock, the user requires the mobile phone to be muted, or the like. That is, the position distributions shown in FIG. 6A and FIG. 6B may be referred to as the disposition operation position distribution.

It should be understood that, in the foregoing, schematic diagrams of a user holding a terminal in general cases are described using examples with reference to FIG. 2A to FIG. 6B, and therefore, it is described using examples that, the terminal control apparatus may perform, according to the position distribution of the terminal and the mapping relationship between the position distribution and the terminal control operation, the operation corresponding to the position distribution in order to control the terminal. However, the present disclosure is not limited thereto.

In this embodiment of the present disclosure, the terminal control apparatus may perform, based on the pre-stored mapping relationship between the position distribution and the terminal control operation, the operation corresponding to the position distribution in order to control the terminal. The terminal control apparatus may also first establish the mapping relationship between the position distribution and the terminal control operation, and then perform, based on the mapping relationship and the position distribution, the operation corresponding to the position distribution in order to control the terminal.

Figure 7:
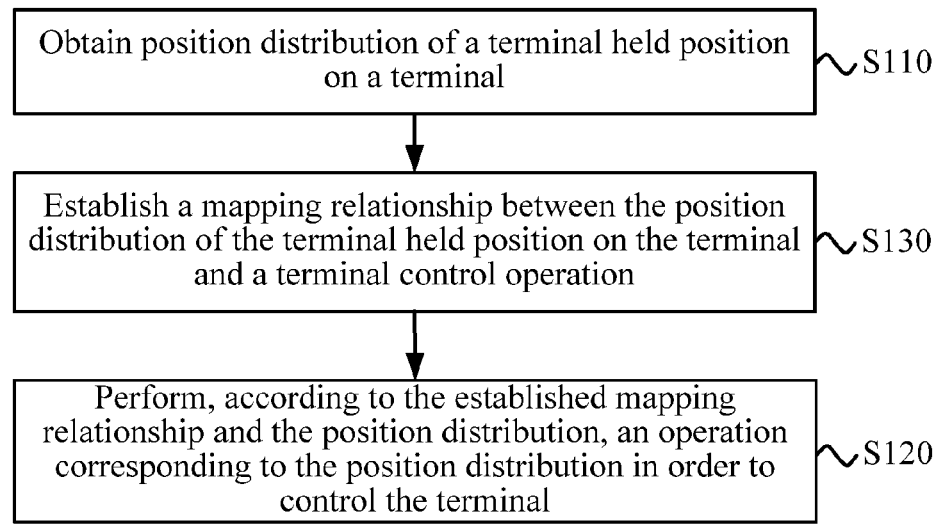
FIG. 7 is another schematic flowchart of a terminal control method according to an embodiment of the present disclosure.

Optionally, as shown in FIG. 7, the terminal control method 100 according to this embodiment of the present disclosure further includes the following step.

Step S130: Establish the mapping relationship between the position distribution of the terminal held position on the terminal and a terminal control operation, where performing, according to a mapping relationship between position distribution and a terminal control operation, an operation corresponding to the position distribution in order to control the terminal includes performing, according to the established mapping relationship and the position distribution, the operation corresponding to the position distribution in order to control the terminal.

Optionally, the position distribution of the terminal held position on the terminal includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, the embodiment of the present disclosure is not limited thereto.

Therefore, the terminal control apparatus can accurately determine, according to the obtained position distribution and the established mapping relationship between the position distribution and the terminal control operation, the intention of the user about controlling the terminal, and may perform the operation corresponding to the position distribution, thereby further improving intelligence and automation levels of controlling a terminal, and improving user experience.

Figure 8:
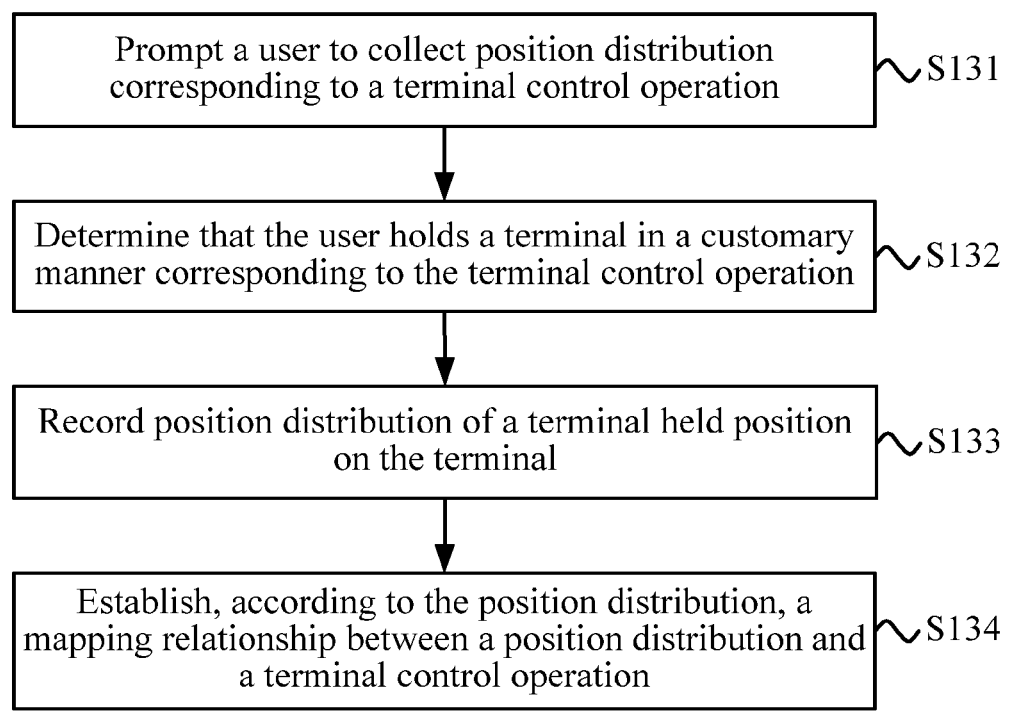
FIG. 8 is a schematic flowchart of a method of establishing a mapping relationship between position distribution and a terminal control operation according to an embodiment of the present disclosure.

In this embodiment of the present disclosure, optionally, as shown in FIG. 8, a method 130 of establishing, by a terminal control apparatus, a mapping relationship between a position distribution and a terminal control operation includes the following steps.

Step S131: Prompt a user to collect the position distribution corresponding to the terminal control operation.

Step S132: Determine that the user holds the terminal in a customary manner corresponding to the terminal control operation.

Step S133: Record a position distribution of a terminal held position on the terminal.

Step S134: Establish, according to the position distribution, the mapping relationship between the position distribution and the terminal control operation.

For example, during initial use by the user, or when some customary manners of the user for holding the terminal are greatly different from preset position distribution, the terminal control apparatus can obtain, using the method of establishing the mapping relationship, the position distribution when the terminal is held by the user in a customary manner such that the terminal control apparatus can perform, based on the customary manner of the user for holding the terminal, more precise intelligent control on the terminal, and can further improve user experience.

For example, the terminal control apparatus prompts the user to collect call operation position distribution corresponding to a call operation, and determines that the user holds the terminal in a customary manner corresponding to the call operation. Therefore, the terminal control apparatus records the call operation position distribution, and establishes the mapping relationship between the call operation position distribution and the call operation. It should be understood that, the call operation is only used as an example for description in the foregoing, this embodiment of the present disclosure is not limited thereto, and the terminal control apparatus may establish various mapping relationships between a position distribution and a terminal control operation.

Figure 9:
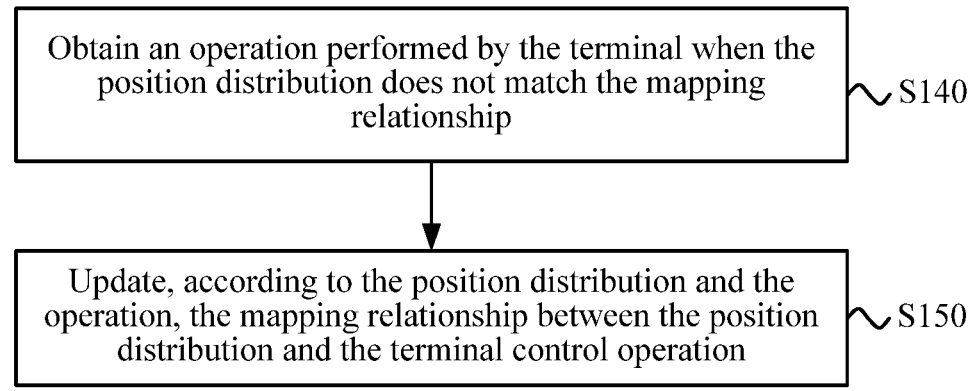
FIG. 9 is still another schematic flowchart of a terminal control method according to an embodiment of the present disclosure.

In this embodiment of the present disclosure, for some special operations of a terminal, or for some special manners of a user for holding a terminal, the terminal control apparatus may further create a new mapping relationship between a position distribution and a terminal control operation. Optionally, as shown in FIG. 9, the terminal control method 100 according to this embodiment of the present disclosure further includes the following steps.

Step S140: Obtain an operation performed by the terminal when the position distribution does not match the mapping relationship.

Step S150: Update, according to the position distribution and the operation, the mapping relationship between the position distribution and the terminal control operation.

It should be understood that, in this embodiment of the present disclosure, a mapping relationship threshold may further be set, and only when the number of mismatches between the position distribution and the mapping relationship is greater than the mapping relationship threshold, the mapping relationship is established, and the mapping relationship is added to the mapping relationship between the position distribution of the terminal held position on the terminal and the terminal control operation in order to update the mapping relationship.

In this embodiment of the present disclosure, the terminal control apparatus may directly perform the corresponding operation according to the obtained position distribution in order to control the terminal, and the terminal control apparatus may also first prompt the user with a to-be-performed operation, and perform the operation after the user confirms the operation. This is described below.

Figure 10:
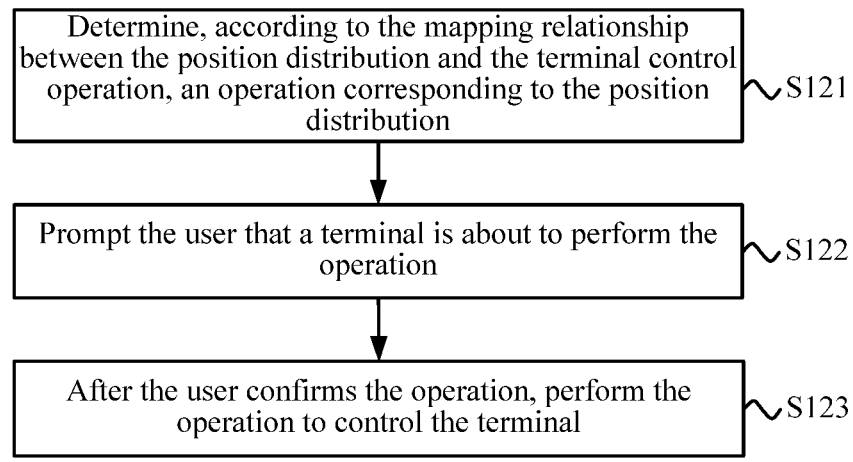
FIG. 10 is a schematic flowchart of a method of performing an operation corresponding to position distribution according to an embodiment of the present disclosure.

As shown in FIG. 10, optionally, a method 120 of performing, by a terminal control apparatus according to a mapping relationship between a position distribution and a terminal control operation, an operation corresponding to the position distribution includes the following steps.

Step S121: Determine, according to the mapping relationship between the position distribution and the terminal control operation, an operation corresponding to the position distribution.

Step S122: Prompt the user that the terminal is about to perform the operation.

Step S123: After the user confirms the operation, perform the operation to control the terminal.

For example, the terminal control apparatus may prompt the user in a manner of displaying a dialog box on the terminal, and the dialog box may, for example, have two selection boxes, where one selection box represents confirm and the other selection box represents cancel. After the user confirms the operation to be performed by the terminal, the terminal control apparatus may perform the operation, and the terminal control apparatus may abandon performing of the operation and do not perform any other operations after the user cancels the operation to be performed by the terminal, and the apparatus may also obtain position distribution of the user holding the terminal again and prompt the user again, and the like.

It should be understood that, the terminal control apparatus may also prompt the user using voice, and certainly, the terminal control apparatus may also prompt the user using other methods for promoting the user by the terminal. Moreover, after the user cancels the operation to be performed by the terminal, the terminal control apparatus may also perform another operation, and this embodiment of the present disclosure is not limited thereto.

In this embodiment of the present disclosure, optionally, when the position distribution, of the terminal held position on the terminal, obtained by the terminal control apparatus is the idle operation position distribution, the terminal control apparatus may directly perform a power-saving operation, and the terminal control apparatus may also prompt the user that the terminal is about to perform the power-saving operation, and perform the power-saving operation after the user confirms the power-saving operation in order to control the terminal. Therefore, the standby time of the terminal can be increased, and energy is saved.

It should be understood that, the power-saving operation may also be referred to as a battery-saving operation, such as, turning off a display screen of the terminal automatically, when there is no data transmission, disconnecting a connection between the terminal and a network, making the terminal to be in sleep state, closing BLUETOOTH and WI-FI, closing animation and touch feedback, shortening a screen timeout, reducing screen brightness, or closing background data and closing an always connected data service.

In this embodiment of the present disclosure, optionally, after the terminal enters in a power-saving mode because the terminal is identified to be in the idle operation position distribution, when the terminal control apparatus determines that the terminal is in non-idle operation position distribution, for example, determines that the terminal is in position distribution such as the browsing operation position distribution, the call operation position distribution, the photographing operation position distribution, and the disposition operation position distribution, the terminal control apparatus exits the power-saving mode in which the terminal previously enters automatically.

It should be further understood that, in cases in which the terminal enters the power-saving mode because of other reasons, for example, the user manually starts the power-saving mode, or the terminal enters the power-saving mode after low battery is detected, the terminal control apparatus does not need to control the terminal to exit the power-saving mode.

It should be understood that, in various embodiments of the present disclosure, values of sequence numbers of the foregoing processes do not indicate execution sequences, and the execution sequence of each process should be determined according to a function and inherent logic thereof, but should not form any limit to implementation processes of the embodiments of the present disclosure.

It should be further understood that, in this embodiment of the present disclosure, the terminal control apparatus may be a control unit or a control module integrated in the terminal, that is, the terminal may include the apparatus. Certainly, the terminal control apparatus may also be a separate control device capable of communicating with the terminal. This embodiment of the present disclosure is not limited thereto.

Therefore, in a terminal control method according to this embodiment of the present disclosure, position distribution of a terminal held position on a terminal is obtained, and therefore, intention of a user about controlling the terminal can be determined proactively, and a corresponding operation may be performed according to the position distribution and a mapping relationship, thereby improving intelligence and automation levels of controlling a terminal, and improving user experience.

The terminal control method 100 according to obtained position distribution and a mapping relationship between a position distribution and a terminal control operation is described above in detail with reference to FIG. 1 to FIG. 10, and a terminal control method 200 according to obtained position distribution, a terminal posture and a mapping relationship between a position distribution in combination with a terminal posture and a terminal control operation is described below in detail with reference to FIG. 11 to FIG. 15.

Figure 11:
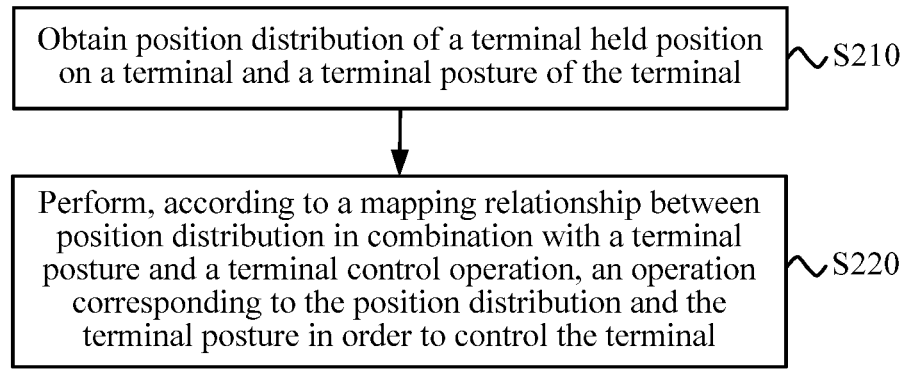
FIG. 11 is a schematic flowchart of a terminal control method according to another embodiment of the present disclosure.

As shown in FIG. 11, the terminal control method 200 according to an embodiment of the present disclosure includes the following steps.

Step S210: Obtain position distribution of a terminal held position on the terminal and a terminal posture of the terminal.

Step S220: Perform, according to a mapping relationship between position distribution in combination with a terminal posture and a terminal control operation, an operation corresponding to the position distribution and the terminal posture in order to control the terminal.

Therefore, in a terminal control method according to this embodiment of the present disclosure, not only position distribution of a terminal held position on a terminal is obtained, but also a terminal posture of the terminal is taken into consideration such that the accuracy of proactively determining intention of a user about controlling the terminal can be further improved, thereby improving intelligence and automation levels of controlling a terminal, and improving user experience.

In this embodiment of the present disclosure, a terminal control apparatus may determine, according to various related parameters, the intention of the user about controlling the terminal, for example, the terminal control apparatus may perform a corresponding operation only according to the obtained position distribution in order to control the terminal, and the terminal control apparatus may also perform a corresponding operation according to the obtained position distribution and terminal posture of the terminal in order to control the terminal. It should be understood that, the terminal posture not only includes a location or an angle, such as an angle of inclination, when the terminal is stationary, but also includes various states or parameters when the terminal is moving, such as falling, rotating or shaking.

Further, the terminal control apparatus may obtain the terminal posture of the terminal using various sensors disposed on the terminal, for example, the terminal control apparatus may obtain the terminal posture using one or more of a proximity sensor, a gyroscope and an acceleration sensor disposed on the terminal. For example, using the acceleration sensor, the terminal control apparatus may learn whether the terminal is face-up or is face-down, and may also learn whether the terminal has a sudden movement such as falling. For another example, using the proximity sensor, the terminal control apparatus may learn a distance between the terminal and an object, and the like. Certainly, the terminal control apparatus may also obtain the terminal posture using other sensors, which is not limited in this embodiment of the present disclosure.

It should be understood that, the proximity sensor may also be referred to as a proximity sensor or a displacement sensor. The proximity sensor detects a physical variation of an object using various elements, and converts the variation into a distance in order to measure a distance or displacement between the sensor and the object. That is, the proximity sensor may sense, in a non-physical contact manner, appearance of an adjacent object. According to different used elements, the proximity sensor may be classified into an optical displacement sensor, a linear proximity sensor, an ultrasonic displacement sensor, or the like. In a mobile phone, the proximity sensor may generally be disposed on two sides of a mobile phone receiver or may be disposed in a groove of the mobile phone receiver in order to facilitate operation of the proximity sensor. When the user is answering or making a call, the user makes the mobile phone approach the head, the proximity sensor may detect a distance between the mobile phone and the head, and after the distance reaches a certain degree, the proximity sensor instructs a screen background light to be turned off. The background light is turned on again when the mobile phone is moved away from the head in order to facilitate the operation of the user and further save power.

An accelerometer may also be referred to as an acceleration sensor, a gravity sensor (Gravity Sensor/G-Sensor), or the like. The accelerometer is an inertial sensor, and can measure an accelerating force of an object. The accelerometer introduced in the mobile phone includes a tri-axis accelerometer, in which the three axes are an X-axis, a Y-axis and a Z-axis. A three-dimensional space formed by the three axes is enough to be used for detecting. During an actual application, an angle of inclination of the mobile phone is calculated generally using an angle formed by the three axes (or any two axes) in order to calculate a value of gravitational acceleration. The accelerometer can measure the acceleration and the gravity by sensing a total inertia force in a specific direction. The tri-axis accelerometer of the mobile phone means that it can detect movement or gravitational attraction in the three-dimensional space. Therefore, the accelerometer cannot only indicate a manner of holding the phone (or an automatic rotation function), and if the phone is placed on a table, the accelerometer can also indicate whether the phone is face-up or is face-down. The accelerometer can measure the gravitational attraction (g), and when a return value of the accelerometer is 1.0, it indicates that 1 g is sensed in a specific direction. If the mobile phone is held statically without any movement, a force applied by the gravity of Earth to the mobile phone is about 1 g. If the mobile phone is held vertically in a longitudinal direction, the mobile phone detects and reports that a force applied to the y-axis thereof is about 1 g. If the mobile phone is held in a certain angle, the force of 1 g may be distributed to different axes, which depends on a manner of holding the mobile phone. The force of 1 g may be uniformly resolved to two axes when the mobile phone is held in an angle of 45 degrees. During normal use, the accelerometer may not detect a value much greater than 1 g on any axis. If the detected value of the accelerometer is much greater than 1 g, it can be determined that this is a sudden movement. If the mobile phone is being shaken, falling, or being thrown, the accelerometer detects a large force on one or more axes in order to output a corresponding electrical signal to implement different functions, for example, automatically turning off a power source/storage when the mobile phone falls, or switching a song when the mobile phone is being shaken, or being applied to various acceleration games.

In terms of motion sensing, the accelerometer has a better sensing capability on a motion having a variation, but is less sensitive to a uniform motion change, which is compensated by the gyroscope. The principle of the gyroscope is that a direction to which a rotation axis of a rotating object points does not change when not being affected by an external force. It is used to keep a direction according to the principle, and the gyroscope is manufactured accordingly. During operation, the gyroscope must be provided with a force to rotate rapidly, generally at hundreds of thousands of revolutions per minute, and the gyroscope can operate for a long time. A direction indicated by the axis is read using various methods, and a data signal is automatically transmitted to a control system. When an object rotates at a high speed, an axis thereof has directional stability. The gyroscope is an omnidirectional angle deflection-detecting instrument in three-dimensional space.

In this embodiment of the present disclosure, the terminal control apparatus may perform, based on a pre-stored mapping relationship between a position distribution in combination with a terminal posture and a terminal control operation, the operation corresponding to the position distribution and the terminal posture in order to control the terminal. The terminal control apparatus may also first establish the mapping relationship between the position distribution in combination with the terminal posture and the terminal control operation, and then perform the corresponding operation according to the mapping relationship, the position distribution and the terminal posture in order to control the terminal.

Figure 12:
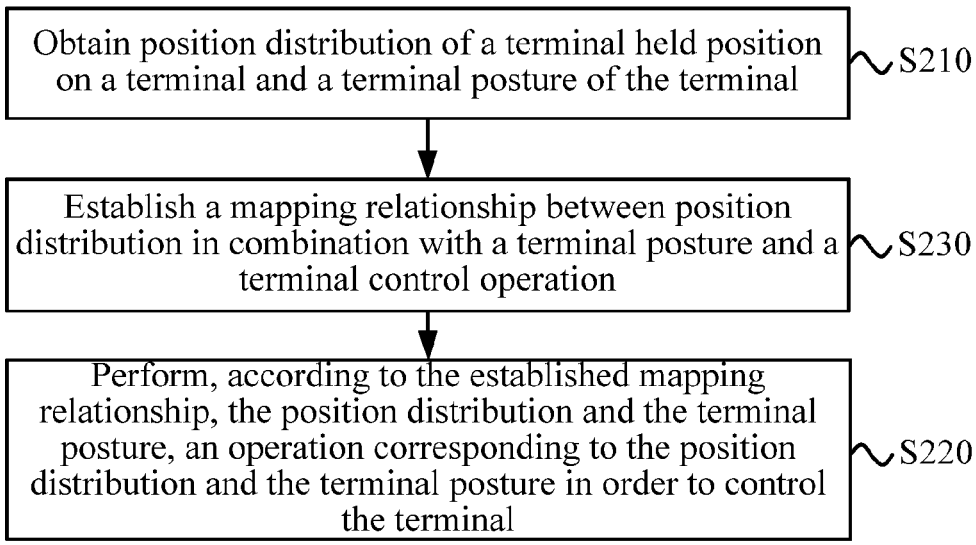
FIG. 12 is another schematic flowchart of a terminal control method according to another embodiment of the present disclosure.

Optionally, as shown in FIG. 12, the terminal control method 200 according to an embodiment of the present disclosure further includes the following step.

Step S230: Establish the mapping relationship between position distribution in combination with a terminal posture and a terminal control operation, where performing, according to a mapping relationship between a position distribution in combination with a terminal posture and a terminal control operation, an operation corresponding to the position distribution and the terminal posture in order to control the terminal includes performing, according to the established mapping relationship, the position distribution and the terminal posture, the operation corresponding to the position distribution and the terminal posture in order to control the terminal.

Optionally, the position distribution of the terminal held position on the terminal includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, this embodiment of the present disclosure is not limited thereto.

Therefore, the terminal control apparatus can accurately determine, according to the obtained position distribution and terminal posture and the established mapping relationship between the position distribution in combination with the terminal posture and the terminal control operation, the intention of the user about controlling the terminal, and may perform the operation corresponding to the position distribution and the terminal posture, thereby further improving intelligence and automation levels of controlling a terminal, and improving user experience.

Figure 13:
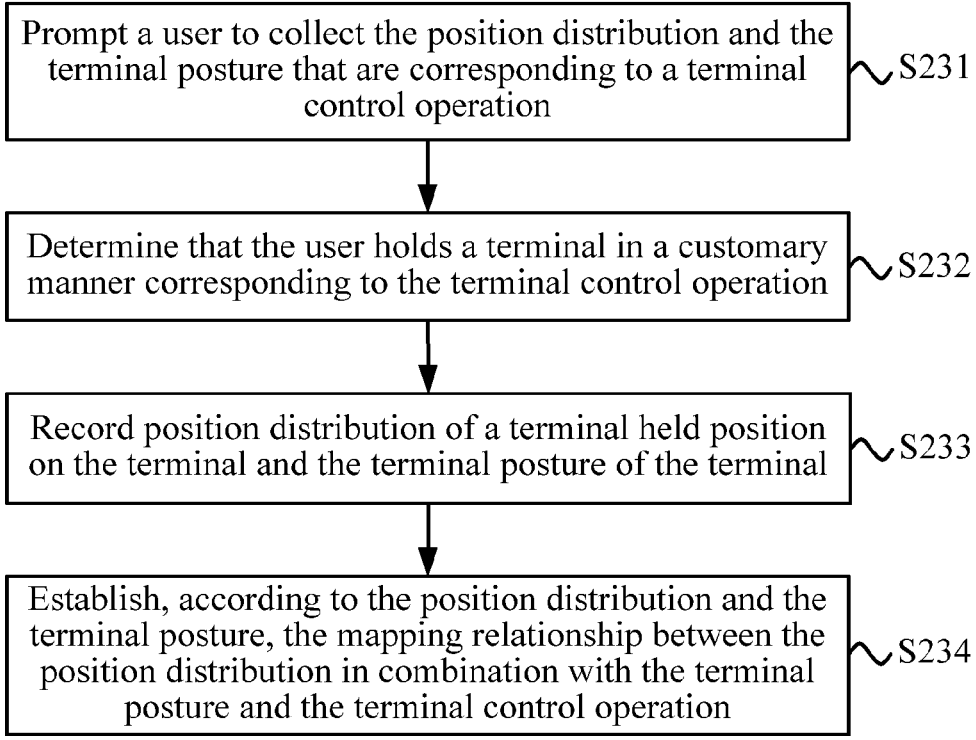
FIG. 13 is a schematic flowchart of a method of establishing a mapping relationship between position distribution in combination with a terminal posture and a terminal control operation according to an embodiment of the present disclosure.

In an embodiment of the present disclosure, optionally, as shown in FIG. 13, a method 230 of establishing, by a terminal control apparatus, a mapping relationship between position distribution in combination with a terminal posture and a terminal control operation includes the following steps.

Step S231: Prompt a user to collect the position distribution and the terminal posture corresponding to a terminal control operation.

Step S232: Determine that the user holds the terminal in a customary manner corresponding to the terminal control operation.

Step S233: Record a position distribution of a terminal held position on the terminal and the terminal posture of the terminal.

Step S234: Establish, according to the position distribution and the terminal posture, the mapping relationship between the position distribution in combination with the terminal posture and the terminal control operation.

Figure 14:
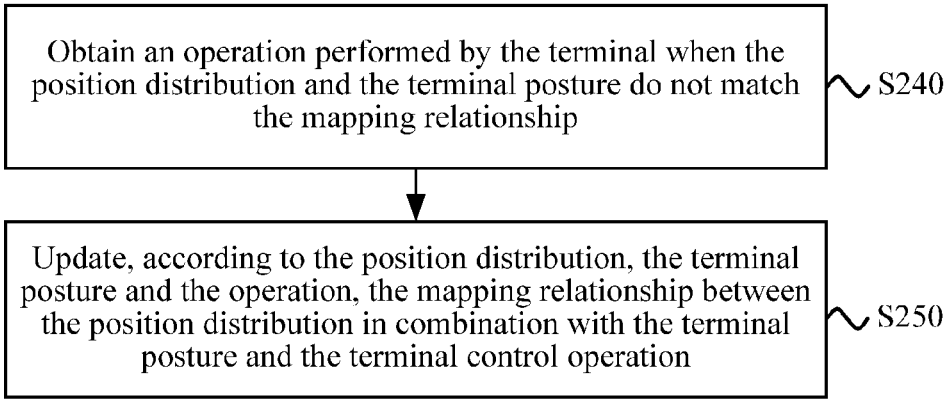
FIG. 14 is still another schematic flowchart of a terminal control method according to another embodiment of the present disclosure.

In this embodiment of the present disclosure, for some special operations of a terminal, or for some special manners of a user for holding a terminal, the terminal control apparatus may further create a new mapping relationship between position distribution in combination with a terminal posture and a terminal control operation. Optionally, as shown in FIG. 14, the terminal control method 200 according to this embodiment of the present disclosure further includes the following steps.

Step S240: Obtain an operation performed by the terminal when the position distribution and the terminal posture do not match the mapping relationship.

Step S250: Update, according to the position distribution, the terminal posture and the operation, the mapping relationship between the position distribution in combination with the terminal posture and the terminal control operation.

It should be understood that, in this embodiment of the present disclosure, the methods for establishing and updating the mapping relationship between the position distribution in combination with the terminal posture and the terminal control operation are respectively similar to the methods for establishing and updating the mapping relationship between the position distribution and the terminal control operation described in the foregoing embodiments, which are not repeated herein for simplicity.

In this embodiment of the present disclosure, the terminal control apparatus may directly perform the corresponding operation according to the obtained position distribution and terminal posture in order to control the terminal, and the terminal control apparatus may also first prompt the user with a to-be-performed operation, and perform the operation after the user confirms the operation. Description is provided below with reference to FIG. 15.

Figure 15:
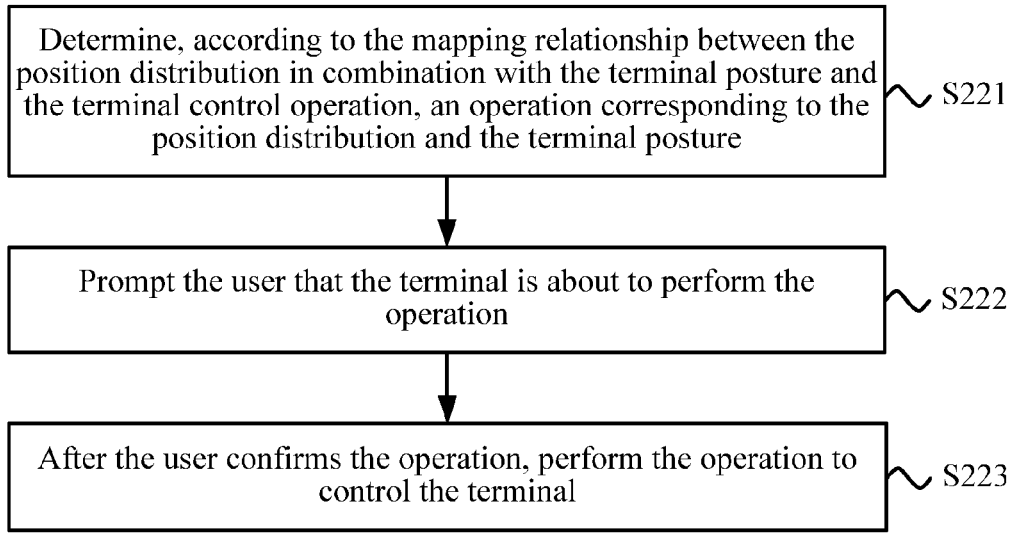
FIG. 15 is a schematic flowchart of a method of performing an operation corresponding to position distribution and a terminal posture according to an embodiment of the present disclosure.

As shown in FIG. 15, a method 220 of performing an operation corresponding to the position distribution and the terminal posture includes the following steps.

Step S221: Determine, according to the mapping relationship between the position distribution in combination with the terminal posture and the terminal control operation, an operation corresponding to the position distribution and the terminal posture.

Step S222: Prompt the user that the terminal is about to perform the operation.

Step S223: After the user confirms the operation, perform the operation to control the terminal.

For example, the terminal control apparatus may prompt the user in a manner of displaying a dialog box on the terminal, and may also prompt the user using voice. Certainly, the terminal control apparatus may also prompt the user in other methods for prompting the user by the terminal, and this embodiment of the present disclosure is not limited thereto.

In this embodiment of the present disclosure, optionally, when the position distribution, of the terminal held position on the terminal, obtained by the terminal control apparatus is the idle operation position distribution, the terminal control apparatus performs an operation corresponding to the position distribution and the terminal posture. Further, the terminal control apparatus directly performs the power-saving operation. The terminal control apparatus may also prompt the user that the terminal is about to perform a power-saving operation, and perform the power-saving operation after the user confirms the power-saving operation in order to control the terminal. Therefore, the standby time of the terminal can be increased, and energy is saved. It should be understood that, the power-saving operation may also be referred to as a battery-saving operation.

It should be understood that, in various embodiments of the present disclosure, values of sequence numbers of the foregoing processes do not indicate execution sequences, and the execution sequence of each process should be determined according to a function and inherent logic thereof, but should not form any limit to implementation processes of the embodiments of the present disclosure.

It should be understood that, in this embodiment of the present disclosure, a corresponding process of the terminal control method 200 is similar to a corresponding process of the terminal control method 100, and therefore, for related descriptions in the method 200, reference may be made to the corresponding descriptions in the method 100, which are not repeated herein for simplicity.

It should be further understood that, in this embodiment of the present disclosure, the terminal control apparatus may be a control unit or a control module integrated in the terminal, that is, the terminal may include the apparatus. Certainly, the terminal control apparatus may also be a separate control device capable of communicating with the terminal. This embodiment of the present disclosure is not limited thereto.

Therefore, in a terminal control method according to this embodiment of the present disclosure, position distribution of a terminal held position on a terminal and a terminal posture are obtained, and therefore, intention of a user about controlling the terminal can be determined proactively, and a corresponding operation may be performed according to the position distribution, the terminal posture and a mapping relationship, thereby improving intelligence and automation levels of controlling a terminal, and improving user experience.

A terminal control method 300 according to obtained position distribution, an obtained current use status of the terminal, and a mapping relationship between position distribution in combination with a use status and a terminal control operation is described below in detail with reference to FIG. 16 to FIG. 20.

Figure 16:
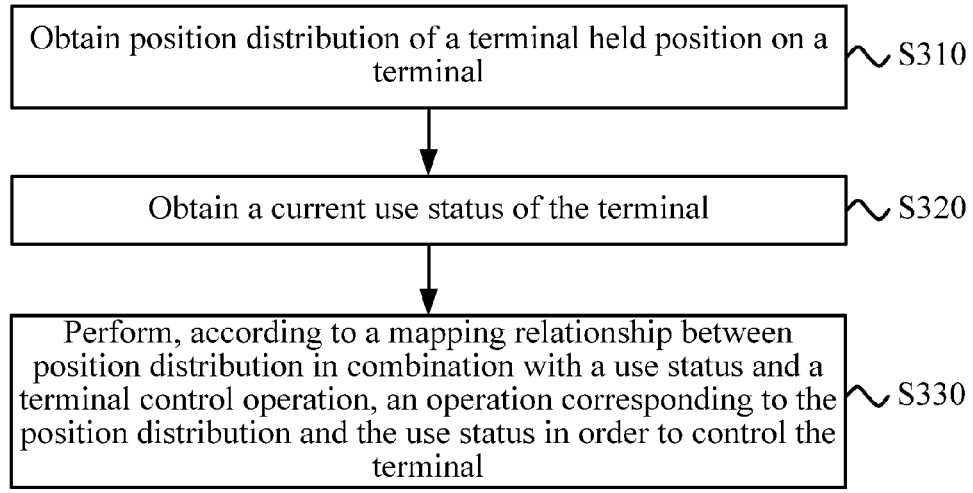
FIG. 16 is a schematic flowchart of a terminal control method according to still another embodiment of the present disclosure.

As shown in FIG. 16, the terminal control method 300 according to an embodiment of the present disclosure includes the following steps.

Step S310: Obtain position distribution of a terminal held position on a terminal.

Step S320: Obtain a current use status of the terminal.

Step S330: Perform, according to a mapping relationship between position distribution in combination with a use status and a terminal control operation, an operation corresponding to the position distribution and the use status in order to control the terminal.

Therefore, in a terminal control method according to this embodiment of the present disclosure, not only position distribution of a terminal held position on a terminal is obtained, but also a current use status of the terminal is taken into consideration such that the accuracy of proactively determining intention of a user about controlling the terminal can be further improved, thereby improving intelligence and automation levels of controlling a terminal, and improving user experience.

In this embodiment of the present disclosure, a terminal control apparatus may perform, based on a pre-stored mapping relationship between a position distribution in combination with a use status and a terminal control operation, the operation corresponding to the position distribution and the use status in order to control the terminal. The terminal control apparatus may also first establish the mapping relationship between the position distribution in combination with the use status and the terminal control operation, and then perform the corresponding operation according to the mapping relationship, the position distribution and the use status in order to control the terminal.

Figure 17:
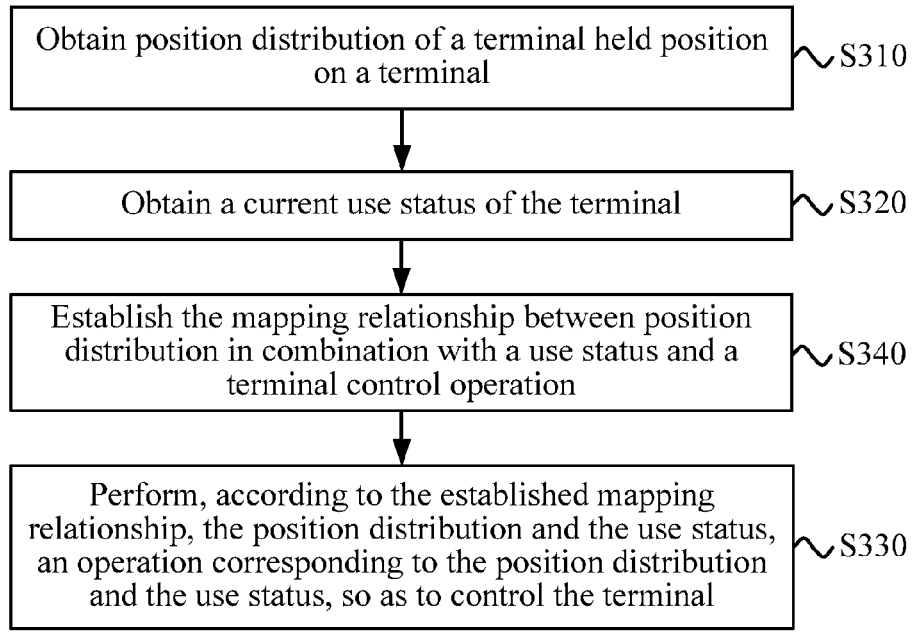
FIG. 17 is another schematic flowchart of a terminal control method according to still another embodiment of the present disclosure.

Further, optionally, as shown in FIG. 17, the terminal control method 300 according to an embodiment of the present disclosure further includes the following step.

Step S340: Establish the mapping relationship between position distribution in combination with a use status and a terminal control operation, where performing, according to a mapping relationship between position distribution in combination with a use status and a terminal control operation, an operation corresponding to the position distribution and the use status in order to control the terminal includes performing, according to the established mapping relationship, the position distribution and the use status, the operation corresponding to the position distribution and the use status in order to control the terminal.

Optionally, the current use status of the terminal includes an incoming call state, a new message arriving state, a message editing state, a browsing state, a photographing state, or the like. Optionally, the position distribution of the terminal held position on the terminal includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, this embodiment of the present disclosure is not limited thereto.

Figure 18:
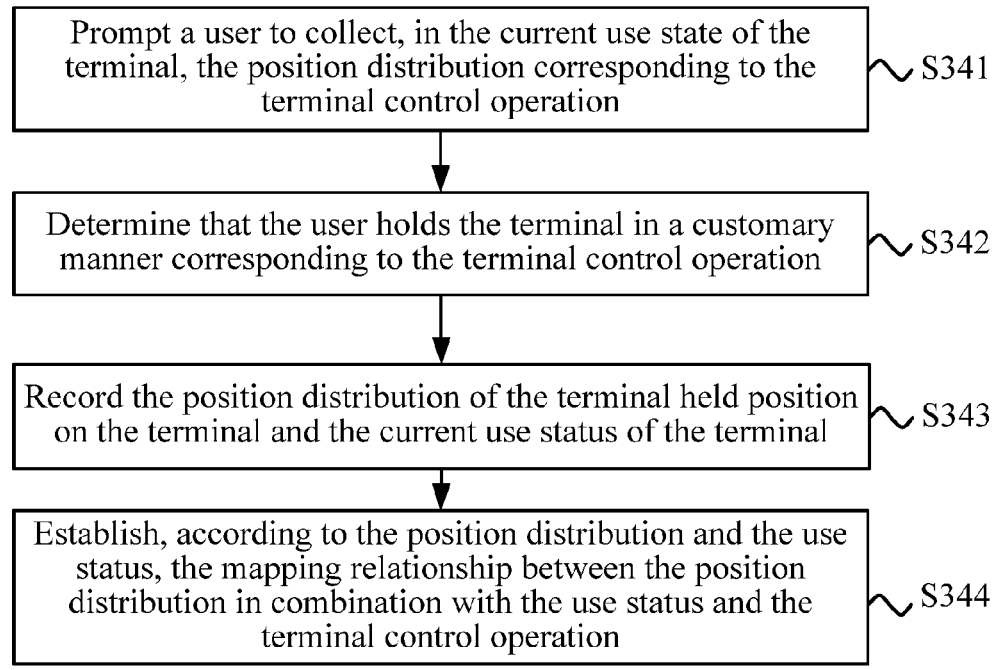
FIG. 18 is a schematic flowchart of a method of establishing a mapping relationship between a position distribution in combination with a use status and a terminal control operation according to an embodiment of the present disclosure.

In an embodiment of the present disclosure, optionally, as shown in FIG. 18, a method 340 of establishing, by a terminal control apparatus, a mapping relationship between a position distribution in combination with a use status and a terminal control operation includes the following steps.

Step S341: Prompt a user to collect, in the current use status of the terminal, the position distribution corresponding to the terminal control operation.

Step S342: Determine that the user holds the terminal in a customary manner corresponding to the terminal control operation.

Step S343: Record the position distribution of the terminal held position on the terminal and the current use status of the terminal.

Step S344: Establish, according to the position distribution and the use status, the mapping relationship between the position distribution in combination with the use status and the terminal control operation.

Figure 19:
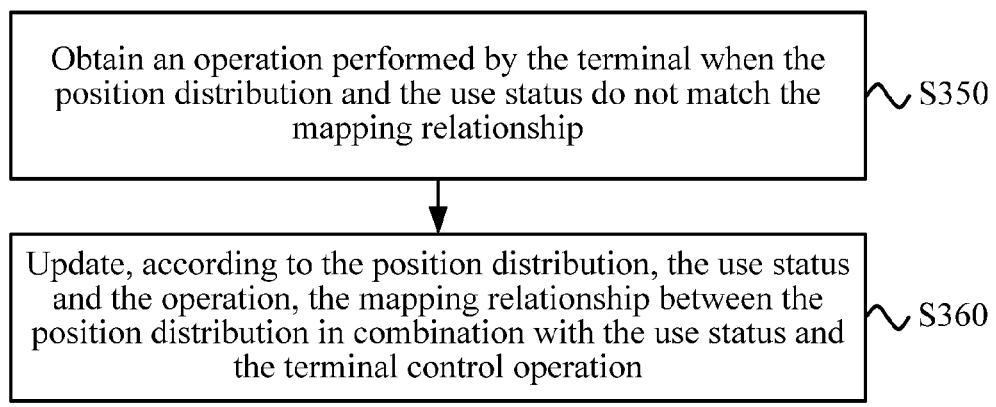
FIG. 19 is still another schematic flowchart of a terminal control method according to still another embodiment of the present disclosure.

In this embodiment of the present disclosure, for some special operations of a terminal, or for some special manners of a user for holding a terminal, the terminal control apparatus may further create a new mapping relationship between position distribution in combination with a use status and a terminal control operation. Optionally, as shown in FIG. 19, the terminal control method 300 according to an embodiment of the present disclosure further includes the following steps.

Step S350: Obtain an operation performed by the terminal when the position distribution and the use status do not match the mapping relationship.

Step S360: Update, according to the position distribution, the use status and the operation, the mapping relationship between the position distribution in combination with the use status and the terminal control operation.

It should be understood that, in this embodiment of the present disclosure, the methods for establishing and updating the mapping relationship between the position distribution in combination with the use status and the terminal control operation are respectively similar to the methods for establishing and updating the mapping relationship between the position distribution and the terminal control operation described in the foregoing embodiments, which are not repeated herein for simplicity.

In this embodiment of the present disclosure, the terminal control apparatus may directly perform the corresponding operation according to the obtained position distribution and use status in order to control the terminal, and the terminal control apparatus may also first prompt the user with a to-be-performed operation, and perform the operation after the user confirms the operation. Description is provided below with reference to FIG. 20.

Figure 20:
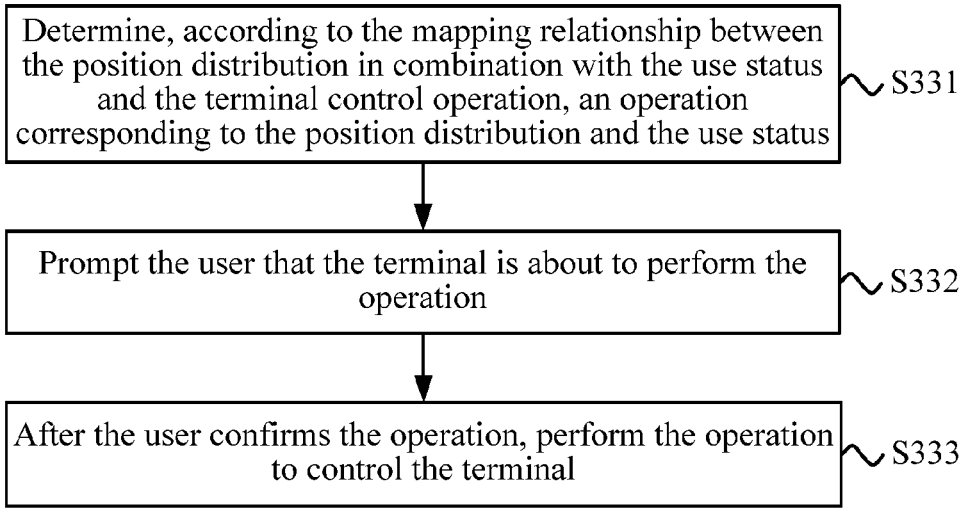
FIG. 20 is a schematic flowchart of a method of performing an operation corresponding to position distribution and a use status according to an embodiment of the present disclosure.

As shown in FIG. 20, a method 330 of performing an operation corresponding to the position distribution and the use status includes the following steps.

Step S331. Determine, according to the mapping relationship between the position distribution in combination with the use status and the terminal control operation, an operation corresponding to the position distribution and the use status.

Step S332: Prompt the user that the terminal is about to perform the operation.

Step S333: After the user confirms the operation, perform the operation to control the terminal.

For example, the terminal control apparatus may prompt the user in a manner of displaying a dialog box on the terminal, and may also prompt the user using voice. Certainly, the terminal control apparatus may also prompt the user in other methods for prompting the user by the terminal, and the embodiment of the present disclosure is not limited thereto.

Therefore, in a terminal control method according to this embodiment of the present disclosure, not only position distribution of a terminal held position on a terminal is obtained, but also a current use status of the terminal is taken into consideration such that the accuracy of proactively determining intention of a user about controlling the terminal can be further improved, thereby improving intelligence and automation levels of controlling a terminal, and improving user experience.

In this embodiment of the present disclosure, regardless of whether the terminal control apparatus directly performs the corresponding operation according to the position distribution, or prompts the user with the to-be-performed operation and performs the operation after the user confirms the operation, the terminal control apparatus can control the terminal further with reference to the current use status of the terminal in order to achieve diversity and accuracy of control.

The method of performing an operation corresponding to the position distribution and the use status is described below with reference to a specific current use status of the terminal.

In this embodiment of the present disclosure, optionally, performing an operation corresponding to the position distribution and the use status in order to control the terminal includes performing a power-saving operation when the position distribution is the idle operation position distribution.

The terminal control apparatus may directly perform the power-saving operation, and the terminal control apparatus may also prompt the user that the terminal is about to perform the power-saving operation, and perform the power-saving operation after the user confirms the power-saving operation in order to control the terminal. Therefore, the standby time of the terminal can be increased, and energy is saved. It should be understood that, the power-saving operation may also be referred to as a battery-saving operation.

In this embodiment of the present disclosure, optionally, performing an operation corresponding to the position distribution and the use status in order to control the terminal includes performing an operation of answering an incoming call when the use status is the incoming call state and the position distribution is the call operation position distribution, or performing a mute operation when the use status is the incoming call state and the position distribution is the disposition operation position distribution.

That is, when the current use status of the terminal is the incoming call state and the user holds the terminal in a call manner, the terminal control apparatus identifies, for example, using a touch sensor on the terminal and using an proximity sensor as assistance, that the position distribution of the terminal held position on the terminal is the call operation position distribution, and accordingly performs an operation of answering an incoming call, the terminal control apparatus identifies that the position distribution of the terminal held position on the terminal is the disposition operation position distribution when the user holds the terminal in a disposition manner, and then performs a mute operation, and the terminal control apparatus may identify that the position distribution is another position distribution and perform a corresponding operation when the user holds the terminal in another manner. Certainly, the terminal control apparatus may also make the terminal to continue to keep in the current use status.

When the terminal control apparatus does not identify the current position distribution, a position distribution record of use habits of the user may be corrected through learning using the foregoing method according to this embodiment of the present disclosure. That is, when a result of identifying position distribution by the terminal control apparatus is different from any previously preset position distribution, the apparatus may further collect a subsequent manual operation of the user, for example, answering a call, muting, rejecting a call, or other operations, and record a mapping relationship between the user operation and a parameter such as terminal touch sensing position distribution and a terminal posture. Moreover, the terminal control apparatus may perform recording for more times, determine a habit of the user after the number of times of recording reaches a certain threshold, and automatically enter an operation state when the same position distribution occurs next time.

In this embodiment of the present disclosure, optionally, performing an operation corresponding to the position distribution and the use status in order to control the terminal includes performing an operation of opening a new message when the use status is the new message arriving state and the position distribution is the browsing operation position distribution, or performing an operation of calling a sender of the new message when the use status is the new message arriving state and the position distribution is the call operation position distribution.

That is, when the current use status of the terminal is the new message arriving state, and the user holds the terminal in a browsing manner, the terminal control apparatus identifies, for example, using a touch sensor on the terminal and using a gyroscope as assistance, that the position distribution of the terminal held position on the terminal is the browsing operation position distribution, and accordingly performs an operation of opening the new message, the terminal control apparatus identifies that the position distribution of the terminal held position on the terminal is the call operation position distribution when the user holds the terminal in a call manner, and then may perform an operation of calling a sender of the message, and the terminal control apparatus may identify that the position distribution is another position distribution and perform a corresponding operation when the user holds the terminal in another manner, and the terminal control apparatus may also make the terminal to continue to keep in the current use status.

In this embodiment of the present disclosure, optionally, performing an operation corresponding to the position distribution and the use status in order to control the terminal includes performing a photographing operation, and inserting a taken picture into the message being currently edited when the use status is the message editing state and the position distribution is the photographing operation position distribution, or performing an operation of calling a receiver of the message being currently edited when the use status is the message editing state and the position distribution is the call operation position distribution.

That is, when the current use status of the terminal is the message editing state, and the user holds the terminal in a photographing manner, the terminal control apparatus may identify that the position distribution of the terminal held position on the terminal is the photographing operation position distribution, and accordingly performs the photographing operation and inserting the taken picture into the message being currently edited. The terminal control apparatus identifies that the position distribution is the call operation position distribution when the user holds the terminal in a call manner, and then may perform an operation of calling a receiver of the message being currently edited, and the terminal control apparatus may identify that the position distribution is another position distribution and perform a corresponding operation when the user holds the terminal in another manner, and the terminal control apparatus may also make the terminal to continue to keep in the current use status.

It should be understood that, in various embodiments of the present disclosure, values of sequence numbers of the foregoing processes do not indicate execution sequences, and the execution sequence of each process should be determined according to a function and inherent logic thereof, but should not form any limit to implementation processes of the embodiments of the present disclosure.

It should be understood that, in this embodiment of the present disclosure, a corresponding process of the terminal control method 300 is similar to a corresponding process of the terminal control method 100 or 200, and therefore, for related descriptions in the method 300, reference may be made to the corresponding descriptions in the method 100 or 200, which are not repeated herein for simplicity.

It should be further understood that, in this embodiment of the present disclosure, the terminal control apparatus may be a control unit or a control module integrated in the terminal, that is, the terminal may include the apparatus. Certainly, the terminal control apparatus may also be a separate control device capable of communicating with the terminal. This embodiment of the present disclosure is not limited thereto.

Therefore, in a terminal control method according to this embodiment of the present disclosure, position distribution of a terminal held position on a terminal and a use status are obtained, and therefore, intention of a user about controlling the terminal can be determined proactively, and a corresponding operation may be performed according to the position distribution, the use status and a mapping relationship, thereby improving intelligence and automation levels of controlling a terminal, and improving user experience.

A terminal control method 400 according to obtained position distribution, an obtained terminal posture, an obtained current use status of the terminal, and a mapping relationship between a position distribution in combination with a terminal posture and a use status and a terminal control operation is described below in detail with reference to FIG. 21 to FIG. 25.

Figure 21:
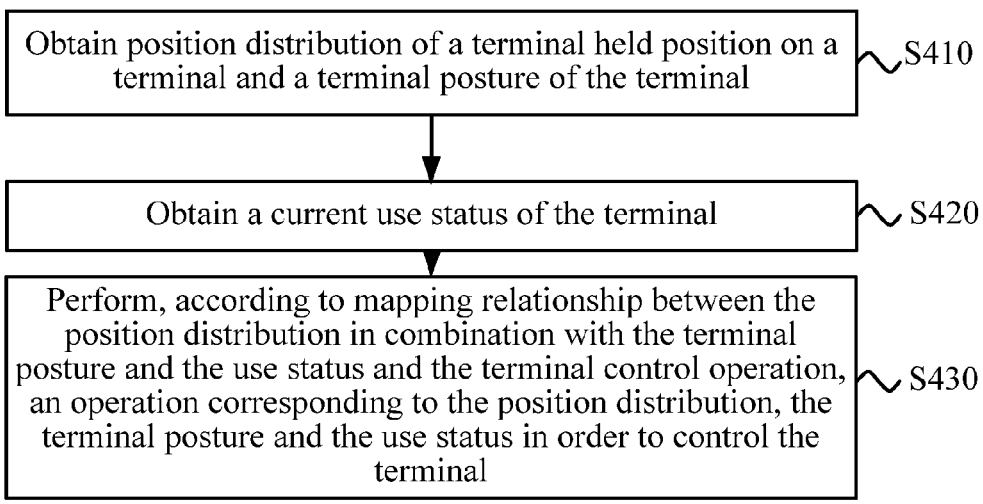
FIG. 21 is a schematic flowchart of a terminal control method according to still another embodiment of the present disclosure.

As shown in FIG. 21, the terminal control method 400 according to an embodiment of the present disclosure includes the following steps.

Step S410: Obtain position distribution of a terminal held position on a terminal and a terminal posture of the terminal.

Step S420: Obtain a current use status of the terminal.

Step S430: Perform, according to a mapping relationship between position distribution in combination with a terminal posture, a use status and a terminal control operation, an operation corresponding to the position distribution, the terminal posture and the use status in order to control the terminal.

Therefore, in a terminal control method according to this embodiment of the present disclosure, not only position distribution of a terminal held position on a terminal is obtained, but also a current use status of the terminal and a terminal posture are taken into consideration such that the accuracy of proactively determining intention of a user about controlling the terminal can be further improved, thereby improving intelligence and automation levels of controlling a terminal, and improving user experience.

In this embodiment of the present disclosure, a terminal control apparatus may perform, based on a pre-stored mapping relationship between a position distribution in combination with a terminal posture, a use status and a terminal control operation, the operation corresponding to the position distribution, the terminal posture and the use status in order to control the terminal. The terminal control apparatus may also first establish the mapping relationship between the position distribution in combination with the terminal posture, the use status and the terminal control operation, and then perform the corresponding operation according to the mapping relationship, the position distribution, the terminal posture and the use status in order to control the terminal.

Figure 22:
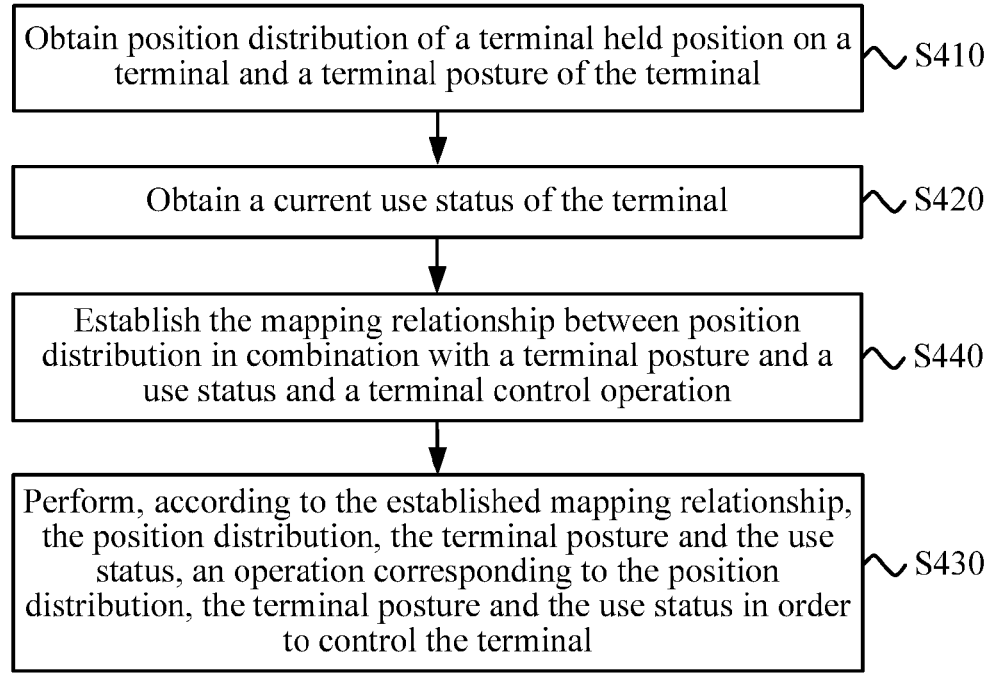
FIG. 22 is another schematic flowchart of a terminal control method according to still another embodiment of the present disclosure.

Optionally, as shown in FIG. 22, the terminal control method 400 according to an embodiment of the present disclosure further includes the following step.

Step S440: Establish the mapping relationship between position distribution in combination with a terminal posture, a use status and a terminal control operation, where the performing, according to a mapping relationship between a position distribution in combination with a terminal posture, a use status and a terminal control operation, an operation corresponding to the position distribution, the terminal posture and the use status in order to control the terminal includes performing, according to the established mapping relationship, the position distribution, the terminal posture and the use status, the operation corresponding to the position distribution, the terminal posture and the use status in order to control the terminal.

Optionally, the current use status of the terminal includes an incoming call state, a new message arriving state, a message editing state, a browsing state, a photographing state, or the like. Optionally, the position distribution of the terminal held position on the terminal includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, this embodiment of the present disclosure is not limited thereto.

It should be understood that, the terminal posture not only includes a location or an angle, such as an angle of inclination, when the terminal is stationary, but also includes various states or parameters when the terminal is moving, such as falling, rotating or shaking.

Further, the terminal control apparatus may obtain the terminal posture of the terminal using various sensors disposed on the terminal, for example, the terminal control apparatus may obtain the terminal posture using one or more of a proximity sensor, a gyroscope and an acceleration sensor disposed on the terminal. For example, using the acceleration sensor, the terminal control apparatus may learn whether the terminal is face-up or is face-down, and may also learn whether the terminal has a sudden movement such as falling. For another example, using the proximity sensor, the terminal control apparatus may learn a distance between the terminal and an object, and the like. Certainly, the terminal control apparatus may also obtain the terminal posture using other sensors, which is not limited in this embodiment of the present disclosure.

Figure 23:
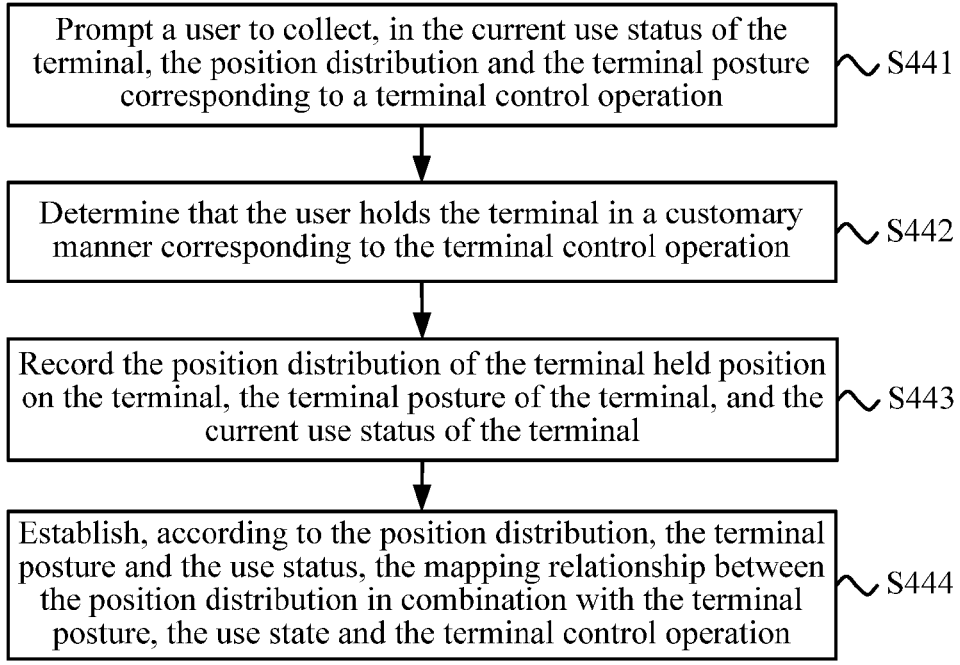
FIG. 23 is a schematic flowchart of a method of establishing a mapping relationship between a position distribution in combination with a terminal posture, a use status and a terminal control operation according to an embodiment of the present disclosure.

In an embodiment of the present disclosure, optionally, as shown in FIG. 23, a method 440 of establishing, by a terminal control apparatus, a mapping relationship between a position distribution in combination with a terminal posture and a use status and a terminal control operation includes the following steps.

Step S441: Prompt a user to collect, in the current use status of the terminal, the position distribution and the terminal posture corresponding to a terminal control operation.

Step S442: Determine that the user holds the terminal in a customary manner corresponding to the terminal control operation.

Step S443: Record the position distribution of the terminal held position on the terminal, the terminal posture of the terminal, and the current use status of the terminal.

Step S444: Establish, according to the position distribution, the terminal posture and the use status, the mapping relationship between the position distribution in combination with the terminal posture, the use status and the terminal control operation.

Figure 24:
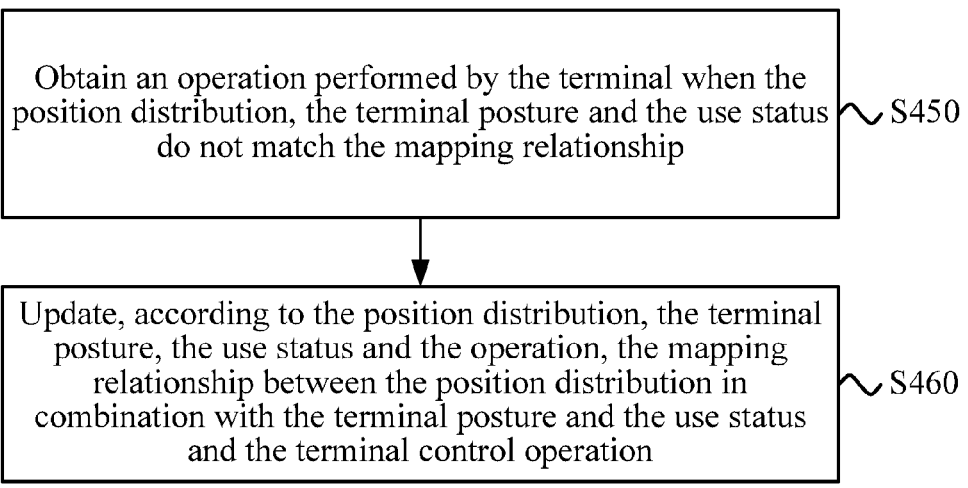
FIG. 24 is still another schematic flowchart of a terminal control method according to still another embodiment of the present disclosure.

In this embodiment of the present disclosure, for some special operations of a terminal, or for some special manners of a user for holding a terminal, the terminal control apparatus may further create a new mapping relationship between a position distribution in combination with a terminal posture, a use status and a terminal control operation. Optionally, as shown in FIG. 24, the terminal control method 400 according to this embodiment of the present disclosure further includes the following steps.

Step S450: Obtain an operation performed by the terminal when the position distribution, the terminal posture and the use status do not match the mapping relationship.

Step S460: Update, according to the position distribution, the terminal posture, the use status and the operation, the mapping relationship between the position distribution in combination with the terminal posture and the use status and the terminal control operation.

It should be understood that, in this embodiment of the present disclosure, the methods for establishing and updating the mapping relationship between the position distribution in combination with the terminal posture, the use status and the terminal control operation are respectively similar to the methods for establishing and updating the mapping relationship between the position distribution and the terminal control operation described in the foregoing embodiments, which are not repeated herein for simplicity.

In this embodiment of the present disclosure, the terminal control apparatus may directly perform the corresponding operation according to the obtained position distribution, terminal posture and use status in order to control the terminal, and the terminal control apparatus may also first prompt the user with a to-be-performed operation, and perform the operation after the user confirms the operation. Description is provided below with reference to FIG. 25.

Figure 25:
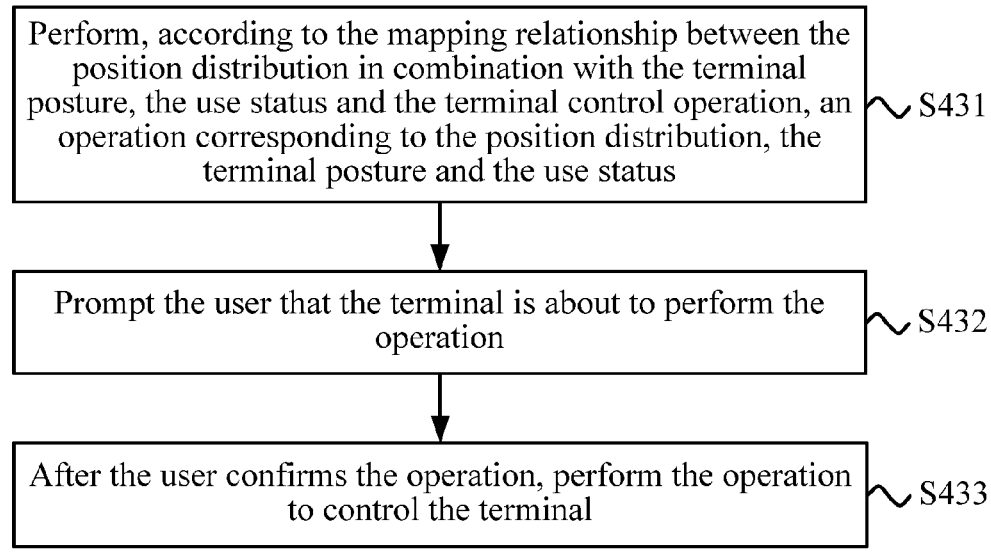
FIG. 25 is a schematic flowchart of a method of performing an operation corresponding to position distribution, a terminal posture and a use status according to an embodiment of the present disclosure.

As shown in FIG. 25, a method 430 of performing an operation corresponding to the position distribution, the terminal posture and the use status includes the following steps.

Step S431: Perform, according to the mapping relationship between the position distribution in combination with the terminal posture, the use status and the terminal control operation, an operation corresponding to the position distribution, the terminal posture and the use status.

Step S432: Prompt the user that the terminal is about to perform the operation.

Step S433: After the user confirms the operation, perform the operation to control the terminal.

For example, the terminal control apparatus may prompt the user in a manner of displaying a dialog box on the terminal, and may also prompt the user using voice. Certainly, the terminal control apparatus may also prompt the user in other methods for prompting the user by the terminal, and this embodiment of the present disclosure is not limited thereto.

Therefore, in a terminal control method according to this embodiment of the present disclosure, not only position distribution of a terminal held position on a terminal is obtained, but also a current use status of the terminal and a terminal posture of the terminal are taken into consideration such that the accuracy of proactively determining intention of a user about controlling the terminal can be further improved, thereby improving intelligence and automation levels of controlling a terminal, and improving user experience.

In this embodiment of the present disclosure, regardless of whether the terminal control apparatus directly performs the corresponding operation according to the position distribution and the terminal posture, or first prompts the user with the to-be-performed operation and performs the operation after the user confirms the operation, the terminal control apparatus can control the terminal further with reference to the current use status of the terminal in order to achieve diversity and accuracy of control.

The method of performing an operation corresponding to the position distribution, the terminal posture and the use status is described below with reference to a specific current use status of the terminal.

In this embodiment of the present disclosure, optionally, the performing an operation corresponding to the position distribution, the terminal posture and the use status in order to control the terminal includes performing a power-saving operation when the position distribution is the idle operation position distribution.

The terminal control apparatus may directly perform the power-saving operation, and the terminal control apparatus may also prompt the user that the terminal is about to perform the power-saving operation, and perform the power-saving operation after the user confirms the power-saving operation in order to control the terminal. Therefore, the standby time of the terminal can be increased, and energy is saved. It should be understood that, the power-saving operation may also be referred to as a battery-saving operation.

In this embodiment of the present disclosure, optionally, performing an operation corresponding to the position distribution, the terminal posture and the use status in order to control the terminal includes performing an operation of answering an incoming call when the use status is the incoming call state and the position distribution is the call operation position distribution, or performing a mute operation when the use status is the incoming call state and the position distribution is the disposition operation position distribution.

In this embodiment of the present disclosure, optionally, performing an operation corresponding to the position distribution, the terminal posture and the use status in order to control the terminal includes performing an operation of opening a new message when the use status is the new message arriving state and the position distribution is the browsing operation position distribution, or performing an operation of calling a sender of the new message when the use status is the new message arriving state and the position distribution is the call operation position distribution.

In this embodiment of the present disclosure, optionally, performing an operation corresponding to the position distribution, the terminal posture and the use status in order to control the terminal includes performing a photographing operation, and inserting a taken picture into the message being currently edited when the use status is the message editing state and the position distribution is the photographing operation position distribution, or performing an operation of calling a receiver of the message being currently edited when the use status is the message editing state and the position distribution is the call operation position distribution.

It should be understood that, in various embodiments of the present disclosure, values of sequence numbers of the foregoing processes do not indicate execution sequences, and the execution sequence of each process should be determined according to a function and inherent logic thereof, but should not form any limit to implementation processes of the embodiments of the present disclosure.

It should be understood that, in this embodiment of the present disclosure, a corresponding process of the terminal control method 400 is similar to a corresponding process of the terminal control method 100, 200 or 300, and therefore, for related descriptions in the method 400, reference may be made to the corresponding descriptions in the method 100, 200 or 300, which are not repeated herein for simplicity.

It should be further understood that, in this embodiment of the present disclosure, the terminal control apparatus may be a control unit or a control module integrated in the terminal, that is, the terminal may include the apparatus. Certainly, the terminal control apparatus may also be a separate control device capable of communicating with the terminal. This embodiment of the present disclosure is not limited thereto.

Therefore, in a terminal control method according to this embodiment of the present disclosure, position distribution of a terminal held position on a terminal, a terminal posture and a use status are obtained, and therefore, intention of a user about controlling the terminal can be determined proactively, and a corresponding operation may be performed according to the position distribution, the terminal posture, the use status and a mapping relationship, thereby improving intelligence and automation levels of controlling a terminal, and improving user experience.

Figure 26:
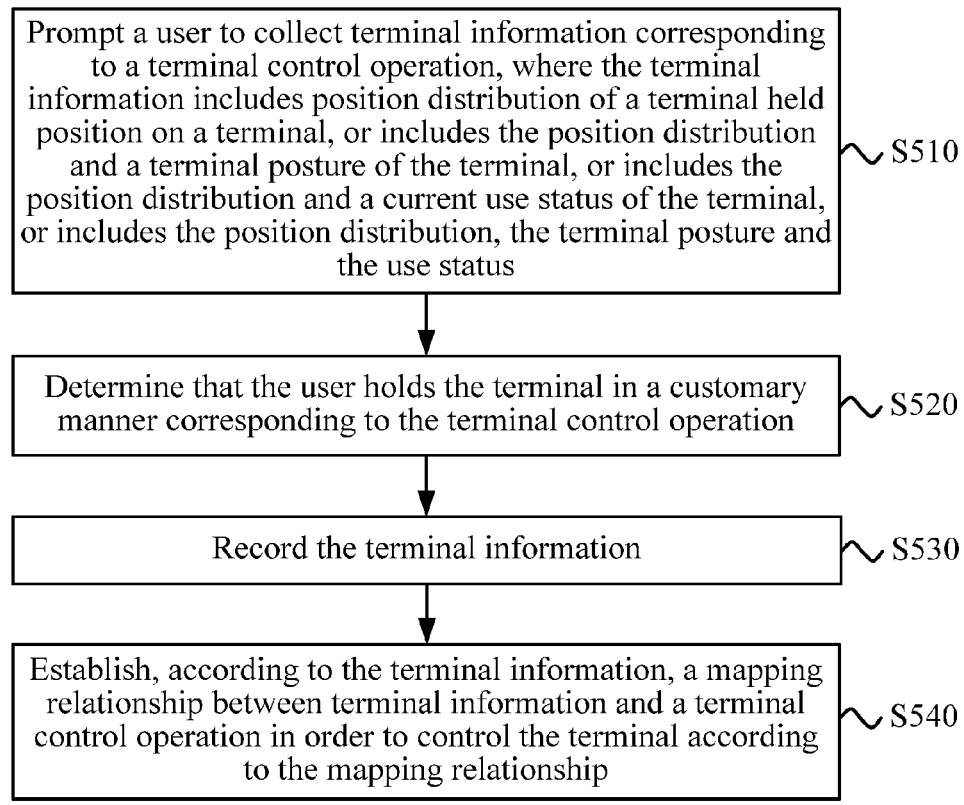
FIG. 26 is a schematic flowchart of a method of establishing a mapping relationship between terminal information and a terminal control operation according to an embodiment of the present disclosure.

As shown in FIG. 26, an embodiment of the present disclosure further provides a terminal control method 500, and optionally, the method 500 includes the following steps.

Step S510: Prompt a user to collect terminal information corresponding to a terminal control operation, where the terminal information includes position distribution of a terminal held position on a terminal, or includes the position distribution and a terminal posture of the terminal, or includes the position distribution and a current use status of the terminal, or includes the position distribution, the terminal posture and the use status.

Step S520: Determine that the user holds the terminal in a customary manner corresponding to the terminal control operation.

Step S530: Record the terminal information.

Step S540: Establish, according to the terminal information, the mapping relationship between terminal information and a terminal control operation in order to control the terminal according to the mapping relationship.

Therefore, in a terminal control method according to this embodiment of the present disclosure, terminal information when a user holds a terminal in a customary manner is obtained, and a mapping relationship between terminal information and a terminal control operation is established such that a terminal control apparatus can perform, based on the customary manner of the user for holding the terminal, more precise intelligent control on the terminal in order to improve universality of intelligent terminal control, and further improve user experience.

It should be understood that, in this embodiment of the present disclosure, the terminal information may only include the position distribution of the terminal held position on the terminal, may also include the position distribution and the terminal posture of the terminal, may also include the position distribution and the current use status of the terminal, and may also include the position distribution, the terminal posture and the use status.

It should be further understood that, in this embodiment of the present disclosure, the mapping relationship between the terminal information and the terminal control operation may be a mapping relationship between position distribution and a terminal control operation, may also be a mapping relationship between position distribution in combination with a terminal posture of the terminal and a terminal control operation, may also be a mapping relationship between position distribution in combination with a current use status of the terminal and a terminal control operation, and may also be a mapping relationship between position distribution in combination with a terminal posture, a use status and a terminal control operation.

In this embodiment of the present disclosure, for some special operations of a terminal, or for some special hand positions of a user, the terminal control apparatus may further create new position distribution and create a corresponding mapping relationship. Optionally, the terminal control method 500 according to this embodiment of the present disclosure may further include obtaining an operation performed by the terminal in the case of the terminal information when the terminal information does not match the mapping relationship, and updating, according to the terminal information and the operation, the mapping relationship between the terminal information and the terminal control operation.

It should be understood that, in this embodiment of the present disclosure, a mapping relationship threshold may further be set, and only when the number of mismatches between the terminal information and the mapping relationship is greater than the mapping relationship threshold, the mapping relationship is updated, that is, newly established mapping relationship is added to the mapping relationship between the terminal information and the terminal control operation.

It should be understood that, in various embodiments of the present disclosure, values of sequence numbers of the foregoing processes do not indicate execution sequences, and the execution sequence of each process should be determined according to a function and inherent logic thereof, but should not form any limit to implementation processes of the embodiments of the present disclosure.

It should be further understood that, in this embodiment of the present disclosure, the terminal control method 500 may further have corresponding processes of the methods in FIG. 1 to FIG. 25 in order to control the terminal. However, for simplicity, details are not repeated herein.

Therefore, in a terminal control method according to this embodiment of the present disclosure, a terminal control apparatus can perform, based on a customary manner of a user for holding a terminal, more precise intelligent control on the terminal in order to improve universality of intelligent terminal control, and further improve user experience.

Figure 27:
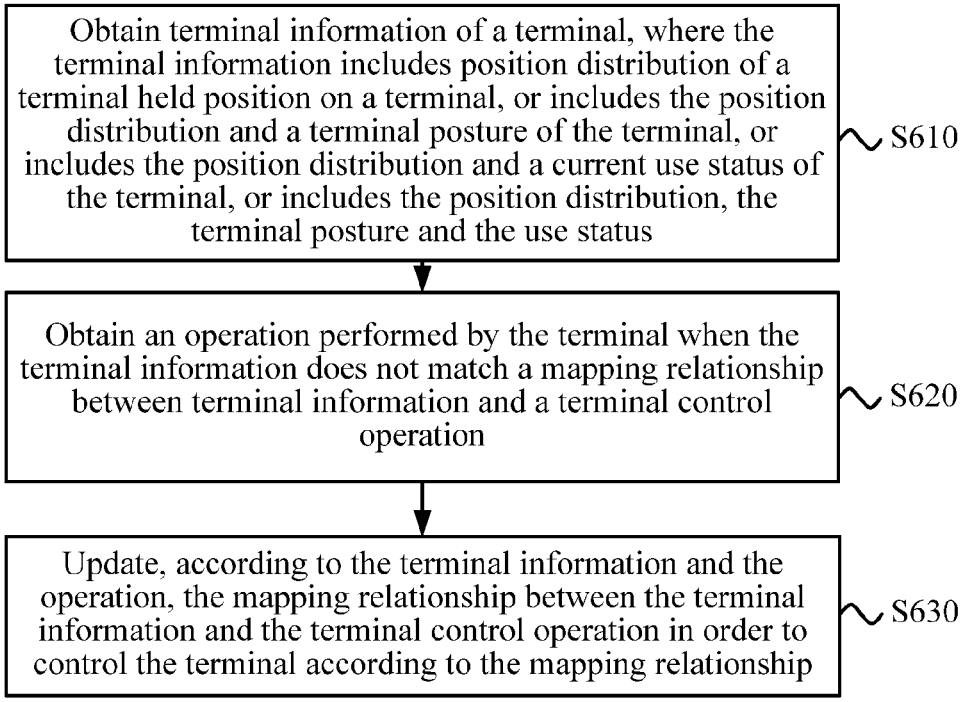
FIG. 27 is a schematic flowchart of a method of updating a mapping relationship between terminal information and a terminal control operation according to an embodiment of the present disclosure.

An embodiment of the present disclosure further provides a terminal control method 600, as shown in FIG. 27, and optionally, the method 600 includes the following steps.

Step S610: Obtain terminal information of a terminal, where the terminal information includes position distribution of a terminal held position on a terminal, or includes the position distribution and a terminal posture of the terminal, or includes the position distribution and a current use status of the terminal, or includes the position distribution, the terminal posture and the use status.

Step S620: Obtain an operation performed by the terminal when the terminal information does not match a mapping relationship between terminal information and a terminal control operation.

Step S630: Update, according to the terminal information and the operation, the mapping relationship between the terminal information and the terminal control operation in order to control the terminal according to the mapping relationship.

In this embodiment of the present disclosure, optionally, the method 600 may further include prompting a user to collect terminal information corresponding to a terminal control operation, where the terminal information includes position distribution of a terminal held position on a terminal, or includes the position distribution and a terminal posture of the terminal, or includes the position distribution and a current use status of the terminal, or includes the position distribution, the terminal posture and the use status, determining that the user holds the terminal in a customary manner corresponding to the terminal control operation, recording the terminal information, and establishing, according to the terminal information, the mapping relationship between terminal information and a terminal control operation in order to control the terminal according to the mapping relationship.

In this embodiment of the present disclosure, the terminal information may only include the position distribution of the terminal held position on the terminal, may also include the position distribution and the terminal posture of the terminal, may also include the position distribution and the current use status of the terminal, and may also include the position distribution, the terminal posture and the use status. Therefore, it should be understood that, in this embodiment of the present disclosure, the mapping relationship between the terminal information and the terminal control operation may be a mapping relationship between position distribution and a terminal control operation, may also be a mapping relationship between position distribution in combination with a terminal posture of the terminal and a terminal control operation, may also be a mapping relationship between position distribution in combination with a current use status of the terminal and a terminal control operation, and may also be a mapping relationship between position distribution in combination with a terminal posture, a use status and a terminal control operation.

It should be understood that, in various embodiments of the present disclosure, values of sequence numbers of the foregoing processes do not indicate an execution sequence, and the execution sequence of each process should be determined according to a function and inherent logic thereof, but should not form any limit to implementation processes of the embodiments of the present disclosure.

It should be further understood that, in this embodiment of the present disclosure, the terminal control method 600 may further have corresponding processes of the methods in FIG. 1 to FIG. 25 in order to control the terminal. However, for simplicity, details are not repeated herein.

Therefore, in a terminal control method according to this embodiment of the present disclosure, terminal information when a user holds a terminal in a customary manner is obtained, and a mapping relationship between terminal information and a terminal control operation is established such that a terminal control apparatus can perform, based on the customary manner of the user for holding the terminal, more precise intelligent control on the terminal in order to improve universality of intelligent terminal control, and further improve user experience.

The terminal control method according to the embodiments of the present disclosure is described above in detail with reference to FIG. 1 to FIG. 27, and a terminal control apparatus and a terminal according to embodiments of the present disclosure are described below with reference to FIG. 28 to FIG. 53.

Figure 28:
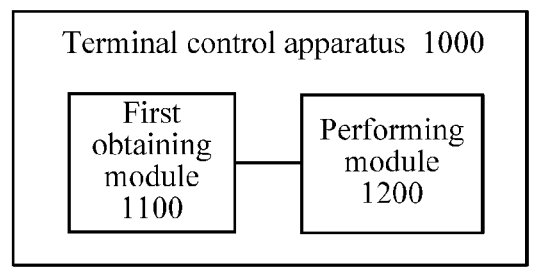
FIG. 28 is a schematic block diagram of a terminal control apparatus according to an embodiment of the present disclosure.

FIG. 28 is a schematic block diagram of a terminal control apparatus 1000 according to an embodiment of the present disclosure. As shown in FIG. 28, the terminal control apparatus 1000 includes a first obtaining module 1100 configured to obtain position distribution of a terminal held position on a terminal, and a performing module 1200 configured to perform, according to a mapping relationship between position distribution and a terminal control operation, an operation corresponding to the position distribution obtained by the first obtaining module 1100 in order to control the terminal.

Therefore, in a terminal control apparatus 1000, according to this embodiment of the present disclosure, position distribution of a terminal held position on a terminal is obtained, and therefore, intention of a user about controlling the terminal can be determined proactively, and a corresponding operation may be performed according to the position distribution, thereby improving intelligence and automation levels of controlling a terminal, and improving user experience.

For example, the first obtaining module 1100 may be various sensors disposed on the terminal in order to obtain the position distribution of the terminal held position on the terminal, and the sensor may include, for example, one or more of sensors such as a resistive sensor, a capacitive sensor, an inductive sensor, a pressure sensor and a piezoelectric sensor. The performing module 1200 may be, for example, corresponding to a CPU of the terminal, and this embodiment of the present disclosure is not limited thereto.

Figure 29:
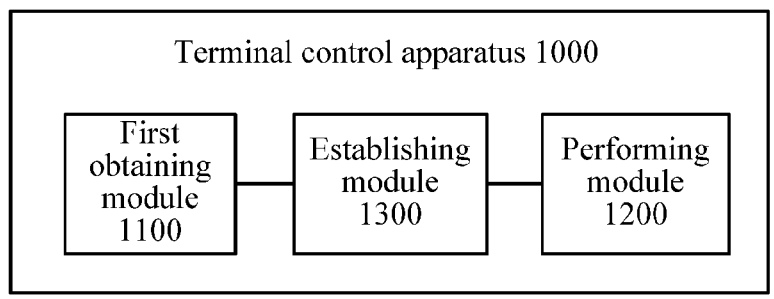
FIG. 29 is another schematic block diagram of a terminal control apparatus according to an embodiment of the present disclosure.

In this embodiment of the present disclosure, optionally, as shown in FIG. 29, the terminal control apparatus 1000 further includes an establishing module 1300 configured to establish the mapping relationship between the position distribution of the terminal held position on the terminal and a terminal control operation, where the performing module 1200 is further configured to perform, according to the established mapping relationship and the position distribution, the operation corresponding to the position distribution in order to control the terminal.

The establishing module 1300 may include, for example, a CPU and a storage of the terminal, and the like, but this embodiment of the present disclosure is not limited thereto.

Figure 30:
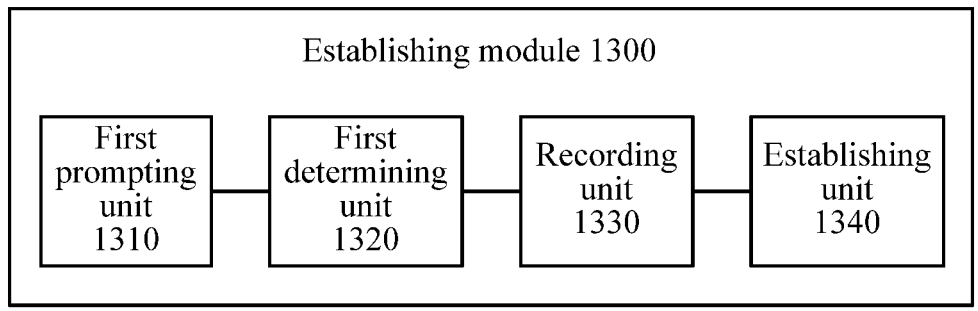
FIG. 30 is a schematic block diagram of an establishing module according to an embodiment of the present disclosure.

In this embodiment of the present disclosure, optionally, as shown in FIG. 30, the establishing module 1300 includes a first prompting unit 1310 configured to prompt a user to collect the position distribution corresponding to the terminal control operation, a first determining unit 1320 configured to determine that the user holds the terminal in a customary manner corresponding to the terminal control operation, a recording unit 1330 configured to record the position distribution of the terminal held position on the terminal, and an establishing unit 1340 configured to establish, according to the position distribution, the mapping relationship between the position distribution and the terminal control operation.

It should be understood that, the recording unit 1330 may be corresponding to a storage of the terminal, such as memory, a hard disk, a flash memory, a synchronous dynamic random access memory (SDRAM) or a flash drive.

Figure 31:
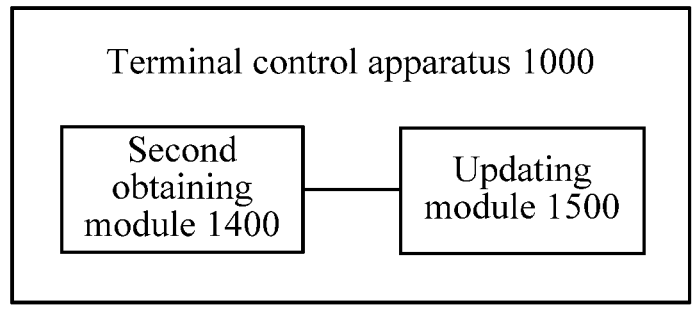
FIG. 31 is still another schematic block diagram of a terminal control apparatus according to an embodiment of the present disclosure.

In this embodiment of the present disclosure, optionally, as shown in FIG. 31, the terminal control apparatus 1000 further includes a second obtaining module 1400 configured to when the position distribution does not match the mapping relationship, obtain an operation performed by the terminal in the case of the position distribution, and an updating module 1500 configured to update the mapping relationship between the position distribution and the terminal control operation according to the position distribution and the operation.

It should be understood that, the second obtaining module 1400 may be corresponding to various sensors disposed on the terminal, and the terminal may include, for example, one or more of sensors such as a resistive sensor, a capacitive sensor, an inductive sensor, a pressure sensor, and a piezoelectric sensor.

Figure 32:
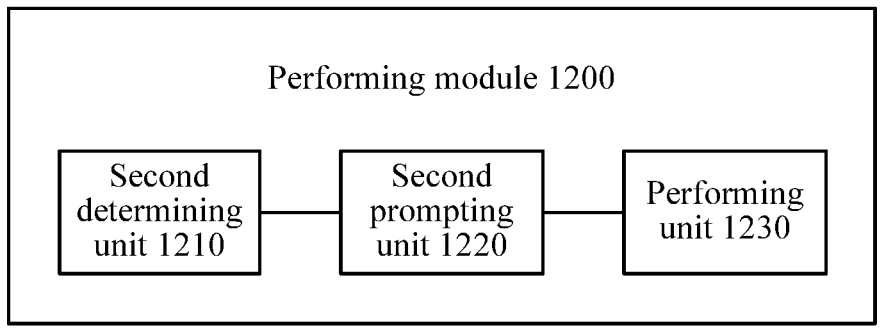
FIG. 32 is a schematic block diagram of a performing module according to an embodiment of the present disclosure.

In this embodiment of the present disclosure, optionally, as shown in FIG. 32, the performing module 1200 includes a second determining unit 1210 configured to determine, according to the mapping relationship between the position distribution and the terminal control operation, an operation corresponding to the position distribution, a second prompting unit 1220 configured to prompt the user that the terminal is about to perform the operation, and a performing unit 1230 configured to perform the operation to control the terminal after the user confirms the operation.

In this embodiment of the present disclosure, optionally, the position distribution includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, this embodiment of the present disclosure is not limited thereto.

For example, the terminal control apparatus 1000 may prompt the user in a manner of displaying a dialog box on the terminal, and the dialog box may, for example, have two selection boxes, where one selection box represents confirm and the other selection box represents cancel. After the user confirms the operation to be performed by the terminal, the terminal control apparatus 1000 may perform the operation, and after the user cancels the operation to be performed by the terminal, the terminal control apparatus 1000 may abandon performing of the operation and do not perform any other operations, and the terminal control apparatus 1000 may also obtain position distribution of the user holding the terminal again and prompt the user again, and the like.

It should be understood that, the terminal control apparatus 1000 may also prompt the user using voice, and certainly, the terminal control apparatus 1000 may also prompt the user using other methods for prompting the user by the terminal. Moreover, after the user cancels the operation to be performed by the terminal, the terminal control apparatus 1000 may also perform another operation, and this embodiment of the present disclosure is not limited thereto.

In this embodiment of the present disclosure, optionally, the performing module 1200 includes a performing submodule (not shown) configured to perform a power-saving operation when the position distribution is the idle operation position distribution.

In this embodiment of the present disclosure, optionally, when the position distribution, of the terminal held position on the terminal, obtained by the terminal control apparatus 1000 is the idle operation position distribution, the terminal control apparatus 1000 may directly perform a power-saving operation, and the terminal control apparatus 1000 may also prompt the user that the terminal is about to perform the power-saving operation, and perform the power-saving operation after the user confirms the power-saving operation in order to control the terminal. Therefore, the standby time of the terminal can be increased, and energy is saved.

It should be understood that, the power-saving operation may also be referred to as a battery-saving operation, such as, turning off a display screen of the terminal automatically, when there is no data transmission, disconnecting a connection between the terminal and a network, making the terminal to be in sleep state, closing BLUETOOTH and WI-FI, closing animation and touch feedback, shortening a screen timeout, reducing screen brightness, or closing background data and closing an always connected data service.

In this embodiment of the present disclosure, optionally, after the terminal enters in a power-saving mode because the terminal is identified to be in the idle operation position distribution, when the terminal control apparatus 1000 determines that the terminal is in non-idle operation position distribution, for example, determines that the terminal is in position distribution such as the browsing operation position distribution, the call operation position distribution, the photographing operation position distribution, and the disposition operation position distribution, the terminal control apparatus exits the power-saving mode in which the terminal previously enters automatically.

It should be further understood that, when the terminal enters the power-saving mode because of other reasons, for example, the user manually starts the power-saving mode, or the terminal enters the power-saving mode after low battery is detected, the terminal control apparatus 1000 does not need to control the terminal to exit the power-saving mode.

It should be understood that, the performing module 1200 may be corresponding to a CPU of the terminal and the like, and the CPU may execute a program stored in a storage to implement the foregoing functions. However, this embodiment of the present disclosure is not limited thereto.

It should be further understood that, the terminal control apparatus 1000 according to this embodiment of the present disclosure may be corresponding to the apparatus in the terminal control method according to the embodiments of the present disclosure, and the foregoing and other operations and/or functions of the modules in the terminal control apparatus 1000 are used to implement corresponding processes of the methods in FIG. 1 to FIG. 10 respectively, and for simplicity, details are not repeated herein.

Therefore, in a terminal control apparatus 1000 according to this embodiment of the present disclosure, position distribution of a terminal held position on a terminal is obtained, and therefore, intention of a user about controlling the terminal can be determined proactively, and a corresponding operation may be performed according to the position distribution, thereby improving intelligence and automation levels of controlling a terminal, and improving user experience.

Figure 33:
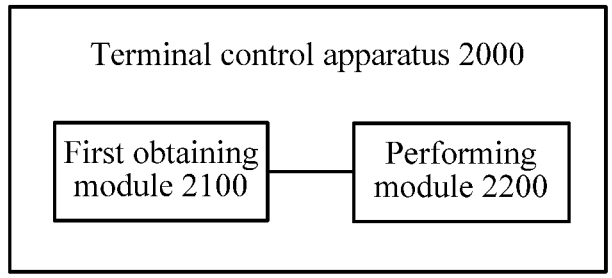
FIG. 33 is a schematic block diagram of a terminal control apparatus according to another embodiment of the present disclosure.

FIG. 33 is a schematic block diagram of a terminal control apparatus 2000 according to an embodiment of the present disclosure. As shown in FIG. 33, the terminal control apparatus 2000 includes a first obtaining module 2100 configured to obtain position distribution of a terminal held position on the terminal and a terminal posture of the terminal, and a performing module 2200 configured to perform, according to a mapping relationship between position distribution in combination with a terminal posture and a terminal control operation, an operation corresponding to the position distribution and the terminal posture that are obtained by the first obtaining module 2100 in order to control the terminal.

Therefore, in a terminal control apparatus 2000 according to this embodiment of the present disclosure, not only position distribution of a terminal held position on a terminal is obtained, but also a terminal posture of the terminal is obtained such that the accuracy of proactively determining intention of a user about controlling the terminal can be further improved, and a corresponding operation may be performed according to the position distribution and the terminal posture, thereby improving intelligence and automation levels of controlling a terminal, and improving user experience.

For example, the first obtaining module 2100 may be various sensors disposed on the terminal in order to obtain the position distribution of the terminal held position on the terminal, and the sensor may include, for example, one or more of sensors such as a resistive sensor, a capacitive sensor, an inductive sensor, a pressure sensor and a piezoelectric sensor. The first obtaining module 2100 may further include one or more of a proximity sensor, a gyroscope and an acceleration sensor in order to obtain posture information of the terminal. The performing module 2200 may be, for example, corresponding to a CPU of the terminal and the like, but the embodiment of the present disclosure is not limited thereto.

Figure 34:
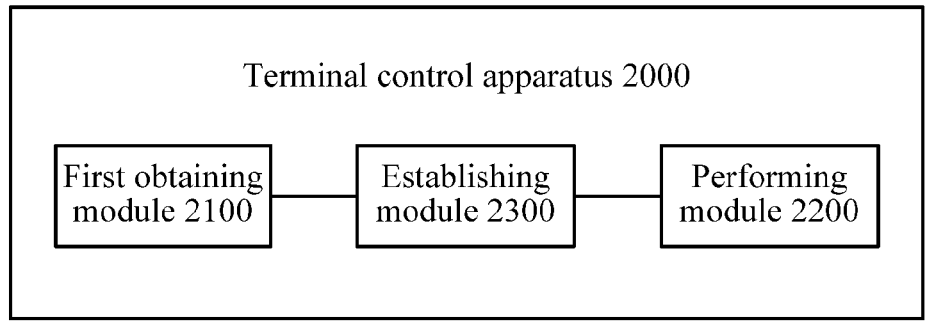
FIG. 34 is another schematic block diagram of a terminal control apparatus according to another embodiment of the present disclosure.

In this embodiment of the present disclosure, optionally, as shown in FIG. 34, the terminal control apparatus 2000 further includes an establishing module 2300 configured to establish the mapping relationship between position distribution in combination with a terminal posture and a terminal control operation, where the performing module 2200 is further configured to perform, according to the established mapping relationship, the position distribution and the terminal posture, the operation corresponding to the position distribution and the terminal posture in order to control the terminal.

The establishing module 2300 may include, for example, a CPU and a storage of the terminal, and the like, but this embodiment of the present disclosure is not limited thereto.

Figure 35:
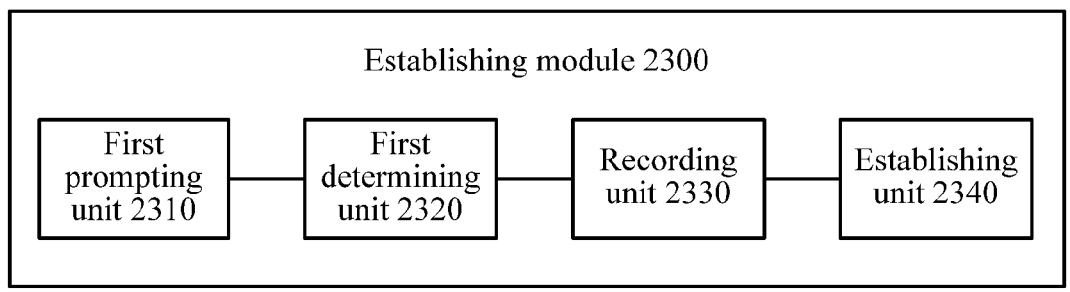
FIG. 35 is a schematic block diagram of an establishing module according to another embodiment of the present disclosure.

In this embodiment of the present disclosure, optionally, as shown in FIG. 35, the establishing module 2300 includes a first prompting unit 2310 configured to prompt a user to collect the position distribution and the terminal posture corresponding to a terminal control operation, a first determining unit 2320 configured to determine that the user holds the terminal in a customary manner corresponding to the terminal control operation, a recording unit 2330 configured to record the position distribution of the terminal held position on the terminal and the terminal posture of the terminal, and an establishing unit 2340 configured to establish, according to the position distribution and the terminal posture, the mapping relationship between the position distribution in combination with the terminal posture and the terminal control operation.

It should be understood that, the recording unit 2330 may be corresponding to a storage of the terminal, such as memory, a hard disk, a flash memory, an SDRAM or a flash drive.

Figure 36:
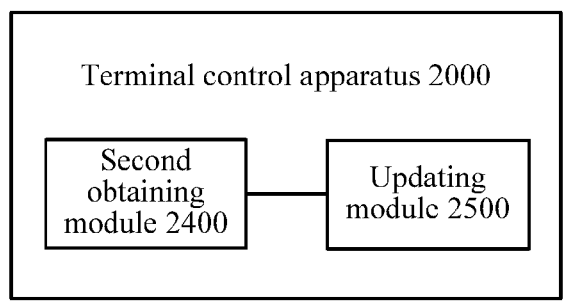
FIG. 36 is still another schematic block diagram of a terminal control apparatus according to another embodiment of the present disclosure.

In this embodiment of the present disclosure, optionally, as shown in FIG. 36, the terminal control apparatus 2000 further includes a second obtaining module 2400 configured to obtain an operation performed by the terminal when the position distribution and the terminal posture do not match the mapping relationship, and an updating module 2500 configured to update, according to the position distribution, the terminal posture and the operation, the mapping relationship between the position distribution in combination with the terminal posture and the terminal control operation.

It should be understood that, the second obtaining module 2400 may be corresponding to various sensors disposed on the terminal, and the terminal may include, for example, one or more of sensors such as a resistive sensor, a capacitive sensor, an inductive sensor, a pressure sensor, and a piezoelectric sensor.

Figure 37:
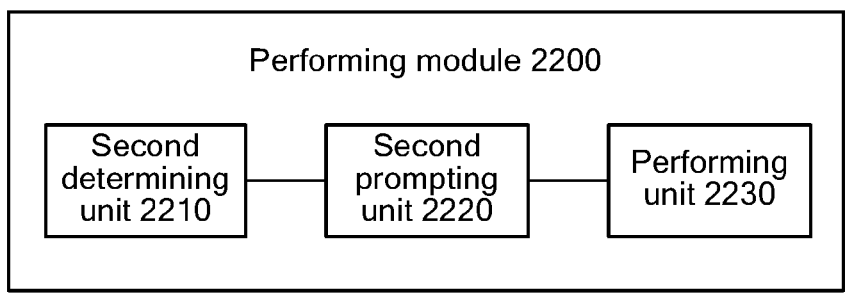
FIG. 37 is a schematic block diagram of a performing module according to another embodiment of the present disclosure.

In this embodiment of the present disclosure, optionally, as shown in FIG. 37, the performing module 2200 includes a second determining unit 2210 configured to determine, according to the mapping relationship between the position distribution in combination with the terminal posture and the terminal control operation, an operation corresponding to the position distribution and the terminal posture, a second prompting unit 2220 configured to prompt the user that the terminal is about to perform the operation, and a performing unit 2230 configured to perform the operation to control the terminal after the user confirms the operation.

In this embodiment of the present disclosure, optionally, the position distribution includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, this embodiment of the present disclosure is not limited thereto.

In this embodiment of the present disclosure, optionally, the performing module 2200 includes a performing submodule (not shown) configured to perform a power-saving operation when the position distribution is the idle operation position distribution.

It should be understood that, the power-saving operation may also be referred to as a battery-saving operation, such as, turning off a display screen of the terminal automatically, when there is no data transmission, disconnecting a connection between the terminal and a network, making the terminal to be in sleep state, closing BLUETOOTH and WI-FI, closing animation and touch feedback, shortening a screen timeout, reducing screen brightness, or closing background data and closing an always connected data service.

It should be understood that, the performing module 2200 may be corresponding to a CPU of the terminal and the like, and the CPU may execute a program stored in a storage to implement the foregoing functions. However, this embodiment of the present disclosure is not limited thereto.

It should be further understood that, the terminal control apparatus 2000 according to this embodiment of the present disclosure may be corresponding to the apparatus in the terminal control method according to the embodiments of the present disclosure, and the foregoing and other operations and/or functions of the modules in the terminal control apparatus 2000 are used to implement corresponding processes of the methods in FIG. 11 to FIG. 15 respectively, and for simplicity, details are not repeated herein.

Therefore, in a terminal control apparatus 2000 according to this embodiment of the present disclosure, position distribution of a terminal held position on a terminal and a terminal posture are obtained, and therefore, intention of a user about controlling the terminal can be determined proactively, and a corresponding operation may be performed according to the position distribution, thereby improving intelligence and automation levels of controlling a terminal, and improving user experience.

Figure 38:
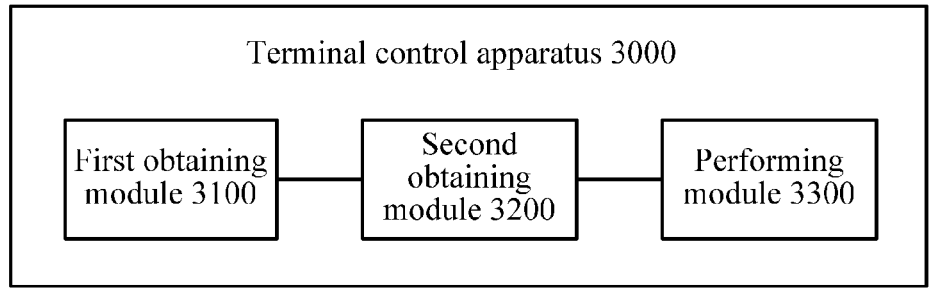
FIG. 38 is a schematic block diagram of a terminal control apparatus according to still another embodiment of the present disclosure.

FIG. 38 is a schematic block diagram of a terminal control apparatus 3000 according to an embodiment of the present disclosure. As shown in FIG. 38, the terminal control apparatus 3000 includes a first obtaining module 3100 configured to obtain position distribution of a terminal held position on a terminal, and a second obtaining module 3200 configured to obtain a current use status of the terminal, and a performing module 3300 configured to perform, according to a mapping relationship between position distribution in combination with a use status and a terminal control operation, an operation corresponding to the position distribution obtained by the first obtaining module 3100 and the use status obtained by the second obtaining module 3200 in order to control the terminal.

Therefore, in a terminal control apparatus 3000 according to this embodiment of the present disclosure, not only position distribution of a terminal held position on a terminal is obtained, but also a use status of the terminal is obtained such that the accuracy of proactively determining intention of a user about controlling the terminal can be further improved, and a corresponding operation may be performed according to the position distribution and the use status, thereby improving intelligence and automation levels of controlling a terminal, and improving user experience.

For example, the first obtaining module 3100 may be various sensors disposed on the terminal in order to obtain the position distribution of the terminal held position on the terminal, and the sensor may include, for example, one or more of sensors such as a resistive sensor, a capacitive sensor, an inductive sensor, a pressure sensor and a piezoelectric sensor. The second obtaining module 3200 may further include one or more of a proximity sensor, a gyroscope and an acceleration sensor in order to obtain the use status of the terminal. The performing module 3300 may be, for example, corresponding to a CPU of the terminal and the like, but this embodiment of the present disclosure is not limited thereto.

Figure 39:
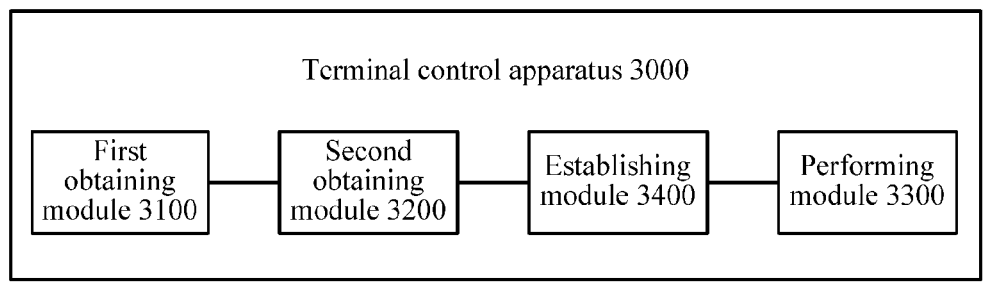
FIG. 39 is another schematic block diagram of a terminal control apparatus according to still another embodiment of the present disclosure.

In this embodiment of the present disclosure, optionally, as shown in FIG. 39, the terminal control apparatus 3000 further includes an establishing module 3400 configured to establish the mapping relationship between position distribution in combination with a use status and a terminal control operation, where the performing module 3300 is further configured to perform, according to the established mapping relationship, the position distribution and the use status, the operation corresponding to the position distribution and the use status in order to control the terminal.

Figure 40:
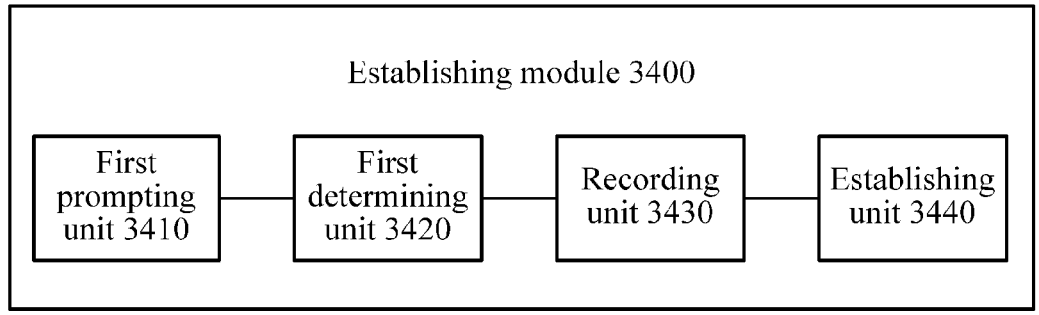
FIG. 40 is a schematic block diagram of an establishing module according to still another embodiment of the present disclosure.

In this embodiment of the present disclosure, optionally, as shown in FIG. 40, the establishing module 3400 includes a first prompting unit 3410 configured to prompt a user to collect, in the current use status of the terminal, the position distribution corresponding to the terminal control operation, a first determining unit 3420 configured to determine that the user holds the terminal in a customary manner corresponding to the terminal control operation, a recording unit 3430 configured to record the position distribution of the terminal held position on the terminal and the use status of the terminal, and an establishing unit 3440 configured to establish, according to the position distribution and the use status, the mapping relationship between the position distribution in combination with the use status and the terminal control operation.

It should be understood that, the recording unit 3430 may be corresponding to a storage of the terminal, such as memory, a hard disk, a flash memory, an SDRAM or a flash drive.

Figure 41:
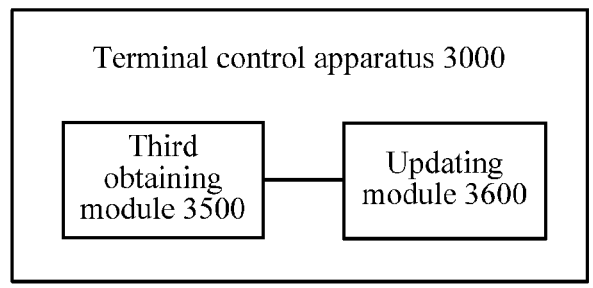
FIG. 41 is still another schematic block diagram of a terminal control apparatus according to still another embodiment of the present disclosure.

In this embodiment of the present disclosure, optionally, as shown in FIG. 41, the terminal control apparatus 3000 further includes a third obtaining module 3500 configured to obtain an operation performed by the terminal when the position distribution and the use status do not match the mapping relationship, and an updating module 3600 configured to update, according to the position distribution, the use status and the operation, the mapping relationship between the position distribution in combination with the use status and the terminal control operation.

It should be understood that, the third obtaining module 3500 may be corresponding to various sensors disposed on the terminal, and the terminal may include, for example, one or more of sensors such as a resistive sensor, a capacitive sensor, an inductive sensor, a pressure sensor, and a piezoelectric sensor.

Figure 42:
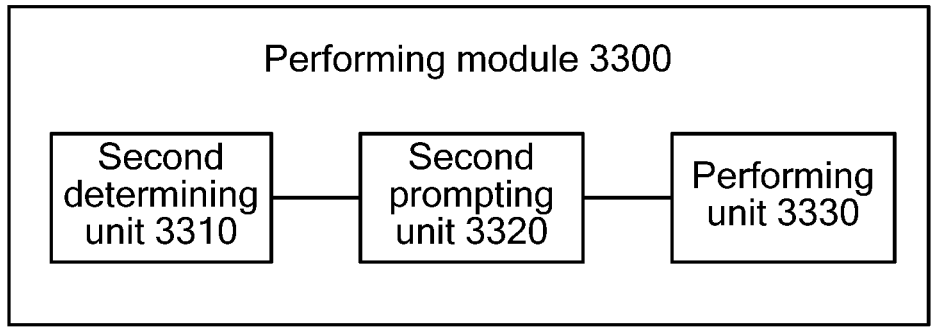
FIG. 42 is a schematic block diagram of a performing module according to still another embodiment of the present disclosure.

In this embodiment of the present disclosure, optionally, as shown in FIG. 42, the performing module 3300 includes a second determining unit 3310 configured to determine, according to the mapping relationship between the position distribution in combination with the use status and the terminal control operation, an operation corresponding to the position distribution and the use status, a second prompting unit 3320 configured to prompt the user that the terminal is about to perform the operation, and a performing unit 3330 configured to perform the operation to control the terminal after the user confirms the operation.

In this embodiment of the present disclosure, optionally, the position distribution includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, this embodiment of the present disclosure is not limited thereto.

Figure 43:
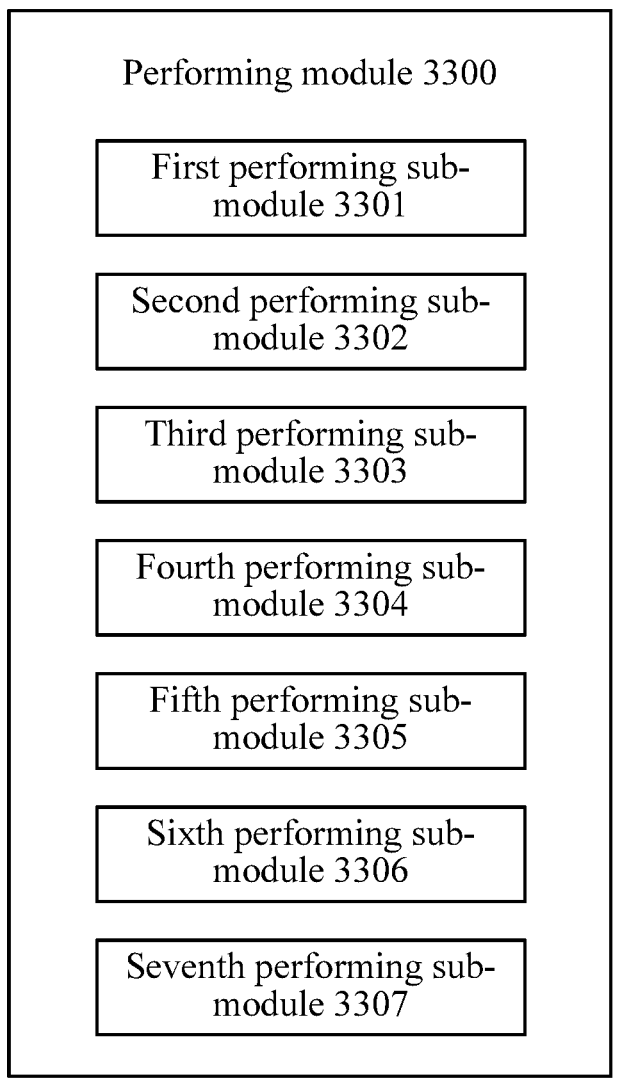
FIG. 43 is another schematic block diagram of a performing module according to still another embodiment of the present disclosure.

In this embodiment of the present disclosure, optionally, as shown in FIG. 43, the performing module 3300 includes a first performing sub-module 3301 configured to perform a power-saving operation when the position distribution is the idle operation position distribution.

In this embodiment of the present disclosure, optionally, as shown in FIG. 43, the performing module 3300 further includes a second performing sub-module 3302 configured to perform an operation of answering an incoming call when the use status is an incoming call state and the position distribution is the call operation position distribution, and/or a third performing sub-module 3303 configured to perform a mute operation when the use status is an incoming call state and the position distribution is the disposition operation position distribution.

In this embodiment of the present disclosure, optionally, as shown in FIG. 43, the performing module 3300 further includes a fourth performing sub-module 3304 configured to perform an operation of opening a new message when the use status is a new message arriving state and the position distribution is the browsing operation position distribution, and/or a fifth performing sub-module 3305 configured to perform an operation of calling a sender of the new message when the use status is a new message arriving state and the position distribution is the call operation position distribution.

In this embodiment of the present disclosure, optionally, as shown in FIG. 43, the performing module 3300 further includes a sixth performing sub-module 3306 configured to perform a photographing operation, and insert a taken picture into the message being currently edited when the use status is a message editing state and the position distribution is the photographing operation position distribution, and/or a seventh performing sub-module 3307 configured to perform an operation of calling a receiver of the message being currently edited when the use status is a message editing state and the position distribution is the call operation position distribution.

It should be understood that, the performing module 3300 may include one or more performing sub-modules including the first performing sub-module 3301 to the seventh performing sub-module 3307, and may also include the seven performing sub-modules.

Moreover, the performing module 3300 and the performing sub-module 3301-3307 described above may be, for example, corresponding to a CPU of the terminal and the like, and the CPU may execute a program stored in a storage to implement the foregoing functions. However, this embodiment of the present disclosure is not limited thereto.

It should be further understood that, the terminal control apparatus 3000 according to this embodiment of the present disclosure may be corresponding to the apparatus in the terminal control method according to the embodiments of the present disclosure, and the foregoing and other operations and/or functions of the modules in the terminal control apparatus 3000 are used to implement corresponding processes of the methods in FIG. 16 to FIG. 20 respectively, and for simplicity, details are not repeated herein.

Therefore, in a terminal control apparatus 3000 according to this embodiment of the present disclosure, position distribution of a terminal held position on a terminal and a use status are obtained, and therefore, intention of a user about controlling the terminal can be determined proactively, and a corresponding operation may be performed according to the position distribution and the use status, thereby improving intelligence and automation levels of controlling a terminal, and improving user experience.

Figure 44:
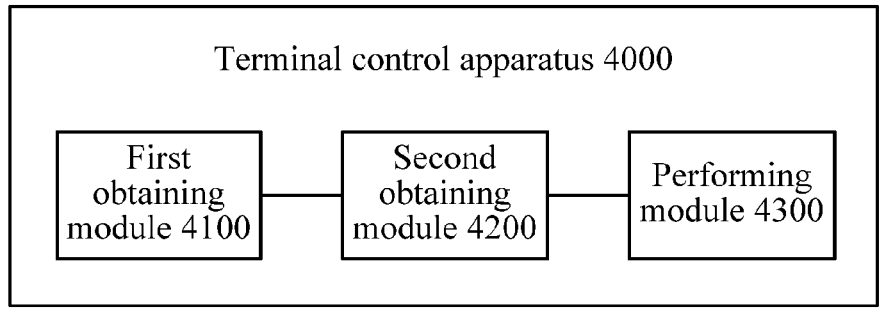
FIG. 44 is a schematic block diagram of a terminal control apparatus according to still another embodiment of the present disclosure.

FIG. 44 is a schematic block diagram of a terminal control apparatus 4000 according to an embodiment of the present disclosure. As shown in FIG. 44, the terminal control apparatus 4000 includes a first obtaining module 4100 configured to obtain position distribution of a terminal held position on a terminal and a terminal posture of the terminal, a second obtaining module 4200 configured to obtain a current use status of the terminal, and a performing module 4300 configured to perform, according to a mapping relationship between position distribution in combination with a terminal posture, a use status and a terminal control operation, an operation corresponding to the position distribution and the terminal posture that are obtained by the first obtaining module 4100 and the use status obtained by the second obtaining module 4200 in order to control the terminal.

Therefore, in a terminal control apparatus 4000 according to this embodiment of the present disclosure, not only position distribution of a terminal held position on a terminal is obtained, but also a use status of the terminal and a terminal posture are obtained such that the accuracy of proactively determining intention of a user about controlling the terminal can be further improved, and a corresponding operation may be performed according to the position distribution, the terminal posture and the use status, thereby improving intelligence and automation levels of controlling a terminal, and improving user experience.

For example, the first obtaining module 4100 may be various sensors disposed on the terminal in order to obtain the position distribution of the terminal held position on the terminal, and the sensor may include, for example, one or more of sensors such as a resistive sensor, a capacitive sensor, an inductive sensor, a pressure sensor and a piezoelectric sensor. The first obtaining module 4100 may further include one or more of a proximity sensor, a gyroscope and an acceleration sensor in order to obtain the use status of the terminal. The second obtaining module 4200 may include one or more of sensors such as a resistive sensor, a capacitive sensor, an inductive sensor, a pressure sensor and a piezoelectric sensor in order to obtain the current use status of the terminal. The performing module 4300 may be, for example, corresponding to a CPU of the terminal and the like, but the embodiment of the present disclosure is not limited thereto.

Figure 45:
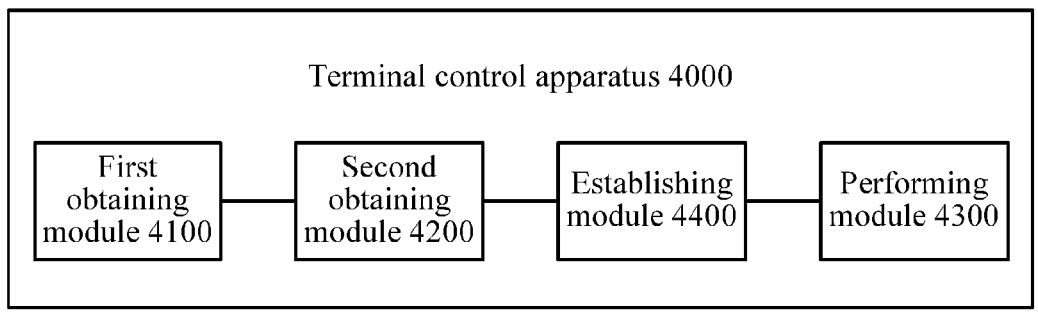
FIG. 45 is another schematic block diagram of a terminal control apparatus according to still another embodiment of the present disclosure.

In this embodiment of the present disclosure, optionally, as shown in FIG. 45, the terminal control apparatus 4000 further includes an establishing module 4400 configured to establish the mapping relationship between position distribution in combination with a terminal posture, a use status and a terminal control operation, where the performing module 4300 is further configured to perform, according to the established mapping relationship, the position distribution, the terminal posture and the use status, the operation corresponding to the position distribution, the terminal posture and the use status in order to control the terminal.

Figure 46:
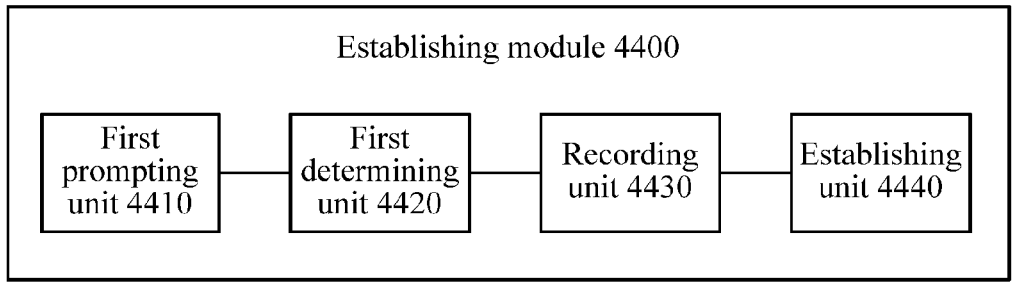
FIG. 46 is a schematic block diagram of an establishing module according to still another embodiment of the present disclosure.

In this embodiment of the present disclosure, optionally, as shown in FIG. 46, the establishing module 4400 includes a first prompting unit 4410 configured to prompt a user to collect, in the current use status of the terminal, the position distribution and the terminal posture corresponding to a terminal control operation, a first determining unit 4420 configured to determine that the user holds the terminal in a customary manner corresponding to the terminal control operation, a recording unit 4430 configured to record the position distribution of the terminal held position on the terminal, the terminal posture of the terminal, and the current use status of the terminal, and an establishing unit 4440 configured to establish, according to the position distribution, the terminal posture and the use status, the mapping relationship between the position distribution in combination with the terminal posture, the use status and the terminal control operation.

It should be understood that, the recording unit 4430 may be corresponding to a storage of the terminal, such as memory, a hard disk, a flash memory, an SDRAM or a flash drive.

Figure 47:
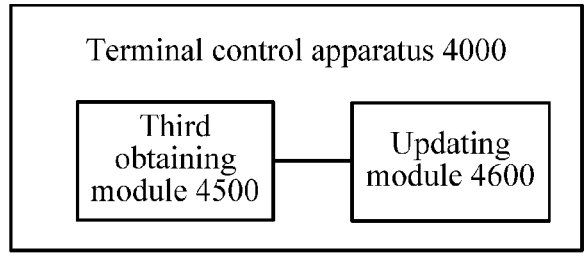
FIG. 47 is still another schematic block diagram of a terminal control apparatus according to still another embodiment of the present disclosure.

In this embodiment of the present disclosure, optionally, as shown in FIG. 47, the terminal control apparatus 4000 further includes a third obtaining module 4500 configured to obtain an operation performed by the terminal when the position distribution, the terminal posture and the use status do not match the mapping relationship, and an updating module 4600 configured to update, according to the position distribution, the terminal posture, the use status and the operation, the mapping relationship between the position distribution in combination with the terminal posture, the use status and the terminal control operation.

It should be understood that, the third obtaining module 4500 may be corresponding to various sensors disposed on the terminal, and the terminal may include, for example, one or more of sensors such as a resistive sensor, a capacitive sensor, an inductive sensor, a pressure sensor, and a piezoelectric sensor.

Figure 48:
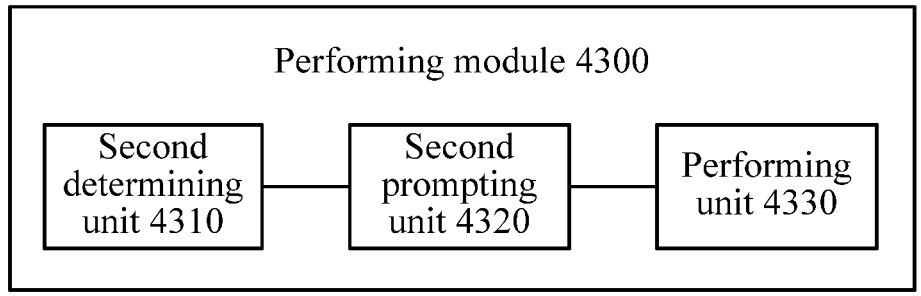
FIG. 48 is a schematic block diagram of a performing module according to still another embodiment of the present disclosure.

In this embodiment of the present disclosure, optionally, as shown in FIG. 48, the performing module 4300 includes a second determining unit 4310 configured to perform, according to the mapping relationship between the position distribution in combination with the terminal posture, the use status and the terminal control operation, an operation corresponding to the position distribution, the terminal posture and the use status, a second prompting unit 4320 configured to prompt the user that the terminal is about to perform the operation, and a performing unit 4330 configured to perform the operation to control the terminal after the user confirms the operation.

In this embodiment of the present disclosure, optionally, the position distribution includes browsing operation position distribution, call operation position distribution, photographing operation position distribution, idle operation position distribution or disposition operation position distribution. Certainly, along with the extension of terminal functions, the position distribution of the terminal held position on the terminal may also include various position distribution corresponding to other terminal control operations, and therefore, this embodiment of the present disclosure is not limited thereto.

Figure 49:
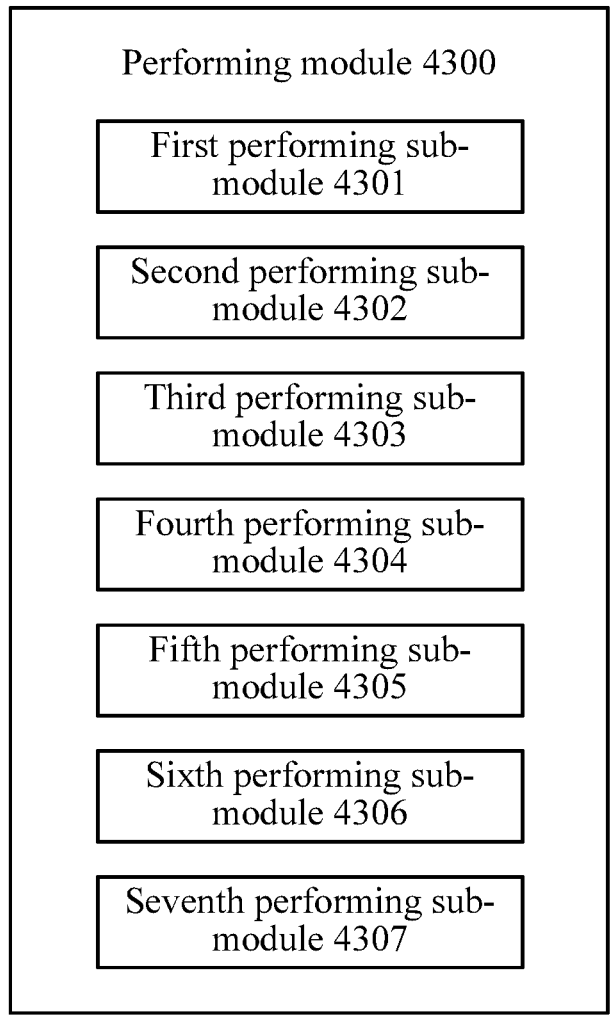
FIG. 49 is another schematic block diagram of a performing module according to still another embodiment of the present disclosure.

In this embodiment of the present disclosure, optionally, as shown in FIG. 49, the performing module 4300 includes a first performing sub-module 4301 configured to perform a power-saving operation when the position distribution is the idle operation position distribution.

In this embodiment of the present disclosure, optionally, as shown in FIG. 49, the performing module 4300 further includes a second performing sub-module 4302 configured to perform an operation of answering an incoming call when the use status is an incoming call state and the position distribution is the call operation position distribution, and/or a third performing sub-module 4303 configured to perform a mute operation when the use status is an incoming call state and the position distribution is the disposition operation position distribution.

In this embodiment of the present disclosure, optionally, as shown in FIG. 49, the performing module 4300 further includes a fourth performing sub-module 4304 configured to perform an operation of opening a new message when the use status is a new message arriving state and the position distribution is the browsing operation position distribution, and/or a fifth performing sub-module 4305 configured to perform an operation of calling a sender of the new message when the use status is a new message arriving state and the position distribution is the call operation position distribution.

In this embodiment of the present disclosure, optionally, as shown in FIG. 49, the performing module 4300 further includes a sixth performing sub-module 4306 configured to perform a photographing operation, and insert a taken picture into the message being currently edited when the use status is a message editing state and the position distribution is the photographing operation position distribution, and/or a seventh performing sub-module 4307 configured to perform an operation of calling a receiver of the message being currently edited when the use status is a message editing state and the position distribution is the call operation position distribution.

It should be understood that, the performing module 4300 may include one or more performing sub-modules including the first performing sub-module 4301 to the seventh performing sub-module 4307, and may also include the seven performing sub-modules. Moreover, the performing module 4300 and the performing sub-modules 4301-4307 described above may be, for example, corresponding to a CPU of the terminal and the like, and the CPU may execute a program stored in a storage to implement the foregoing functions. However, this embodiment of the present disclosure is not limited thereto.

It should be further understood that, the terminal control apparatus 4000 according to this embodiment of the present disclosure may be corresponding to the apparatus in the terminal control method according to the embodiments of the present disclosure, and the foregoing and other operations and/or functions of the modules in the terminal control apparatus 4000 are used to implement corresponding processes of the methods in FIG. 21 to FIG. 25 respectively, and for simplicity, details are not repeated herein.

Therefore, in a terminal control apparatus 4000 according to this embodiment of the present disclosure, position distribution of a terminal held position on a terminal, a terminal posture and a use status are obtained, and therefore, intention of a user about controlling the terminal can be determined proactively, and a corresponding operation may be performed according to the position distribution, the terminal posture and the use status, thereby improving intelligence and automation levels of controlling a terminal, and improving user experience.

Figure 50:
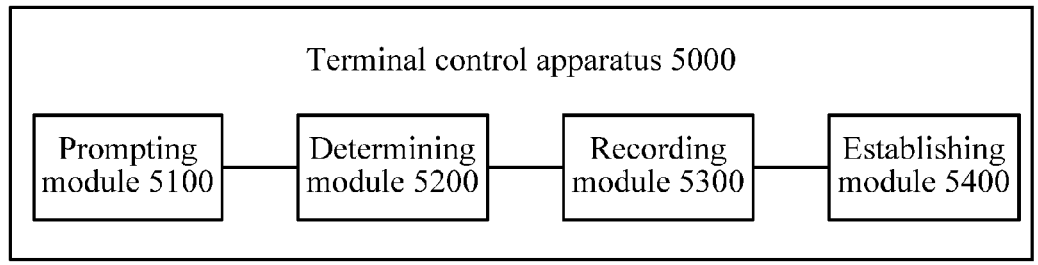
FIG. 50 is a schematic block diagram of a terminal control apparatus according to still another embodiment of the present disclosure.

FIG. 50 is a schematic block diagram of a terminal control apparatus 5000 according to an embodiment of the present disclosure. As shown in FIG. 50, the apparatus 5000 includes a prompting module 5100 configured to prompt a user to collect terminal information corresponding to a terminal control operation, where the terminal information includes position distribution of a terminal held position on a terminal, or includes the position distribution and a terminal posture of the terminal, or includes the position distribution and a current use status of the terminal, or includes the position distribution, the terminal posture and the use status, a determining module 5200 configured to determine that the user holds the terminal in a customary manner corresponding to the terminal control operation, a recording module 5300 configured to record the terminal information, and an establishing module 5400 configured to establish, according to the terminal information recorded by the recording module 5300, the mapping relationship between terminal information and a terminal control operation in order to control the terminal according to the mapping relationship.

It should be understood that, the prompting module 5100, the determining module 5200 and the establishing module 5400 may be corresponding to a CPU of the terminal and the like, and the CPU may execute a program stored in a storage in order to implement the foregoing functions. The recording module 5300 may be corresponding to the storage of the terminal, but this embodiment of the present disclosure is not limited thereto.

It should be understood that, in this embodiment of the present disclosure, the terminal information may only include the position distribution of the terminal held position on the terminal, may also include the position distribution and the terminal posture of the terminal, may also include the position distribution and the current use status of the terminal, and may also include the position distribution, the terminal posture and the use status.

It should be further understood that, in this embodiment of the present disclosure, the mapping relationship between the terminal information and the terminal control operation may be a mapping relationship between position distribution and a terminal control operation, may also be a mapping relationship between position distribution in combination with a terminal posture of the terminal and a terminal control operation, may also be a mapping relationship between position distribution in combination with a current use status of the terminal and a terminal control operation, and may also be a mapping relationship between position distribution in combination with a terminal posture, a use status and a terminal control operation.

In this embodiment of the present disclosure, for some special operations of a terminal, or for some special hand positions of a user, the terminal control apparatus 5000 may further create new position distribution and create a corresponding mapping relationship. Optionally, the terminal control apparatus 5000 according to the present disclosure may further be configured to obtain an operation performed by the terminal when the terminal information does not match the mapping relationship, and update, according to the terminal information and the operation, the mapping relationship between the terminal information and the terminal control operation.

It should be understood that, in this embodiment of the present disclosure, a mapping relationship threshold may further be set, and only when the number of mismatches between the terminal information and the mapping relationship is greater than the mapping relationship threshold, the mapping relationship is updated, that is, newly established mapping relationship is added to the mapping relationship between the terminal information and the terminal control operation.

It should be further understood that, the terminal control apparatus 5000 according to this embodiment of the present disclosure may be corresponding to the apparatus in the terminal control method according to the embodiments of the present disclosure, and the foregoing and other operations and/or functions of the modules in the apparatus 5000 are used to implement corresponding processes of the methods in FIG. 1 to FIG. 26 respectively, and for simplicity, details are not repeated herein.

Therefore, in a terminal control apparatus 5000 according to this embodiment of the present disclosure, a terminal can perform, based on a customary manner of a user for holding the terminal, more precise intelligent control on the terminal in order to improve universality of intelligent terminal control, and further improve user experience.

Figure 51:
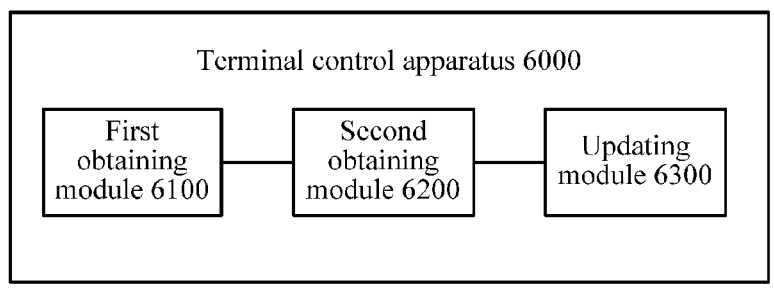
FIG. 51 is a schematic block diagram of a terminal control apparatus according to still another embodiment of the present disclosure.

FIG. 51 is a schematic block diagram of a terminal control apparatus 6000 according to an embodiment of the present disclosure. As shown in FIG. 51, the apparatus 6000 includes a first obtaining module 6100 configured to obtain terminal information of a terminal, where the terminal information includes position distribution of a terminal held position on the terminal, or includes the position distribution and a terminal posture of the terminal, or includes the position distribution and a current use status of the terminal, or includes the position distribution, the terminal posture and the use status, a second obtaining module 6200 configured to obtain an operation performed by the terminal when the terminal information obtained by the first obtaining module 6100 does not match a mapping relationship between terminal information and a terminal control operation, and an updating module 6300 configured to update, according to the terminal information obtained by the first obtaining module 6100 and the operation obtained by the second obtaining module 6200, the mapping relationship between the terminal information and the terminal control operation in order to control the terminal according to the mapping relationship.

In this embodiment of the present disclosure, optionally, the terminal control apparatus 6000 may further be configured to prompt a user to collect terminal information corresponding to a terminal control operation, where the terminal information includes position distribution of a terminal held position on a terminal, or includes the position distribution and a terminal posture of the terminal, or includes the position distribution and a current use status of the terminal, or includes the position distribution, the terminal posture and the use status, determine that the user holds the terminal in a customary manner corresponding to the terminal control operation, record the terminal information, and establish, according to the terminal information, the mapping relationship between terminal information and a terminal control operation in order to control the terminal according to the mapping relationship.

It should be understood that, the first obtaining module 6100 may be corresponding to various sensors disposed on the terminal, for example, the sensor may include one or more of sensors such as a resistive sensor, a capacitive sensor, an inductive sensor, a pressure sensor and a piezoelectric sensor in order to obtain the position distribution and/or use status. For example, the sensor may further include one or more of a proximity sensor, a gyroscope and an acceleration sensor in order to obtain the terminal posture and/or use status of the terminal. It should be further understood that, the second obtaining module 6200 may be corresponding to various posture sensors disposed on the terminal in order to obtain the operation of the terminal. The updating module 6300 may be corresponding to a CPU and a storage of the terminal and the like, and the CPU may execute a program stored in the storage in order to implement the foregoing functions.

It should be further understood that, the terminal control apparatus 6000 according to this embodiment of the present disclosure may be corresponding to the apparatus in the terminal control method according to the embodiments of the present disclosure, and the foregoing and other operations and/or functions of the modules in the apparatus 6000 are used to implement corresponding processes of the methods in FIG. 1 to FIG. 27 respectively, and for simplicity, details are not repeated herein.

Therefore, in a terminal control apparatus 6000 according to this embodiment of the present disclosure, a terminal can perform, based on a customary manner of a user for holding the terminal, more precise intelligent control on the terminal in order to improve universality of intelligent terminal control, and further improve user experience.

Figure 52:
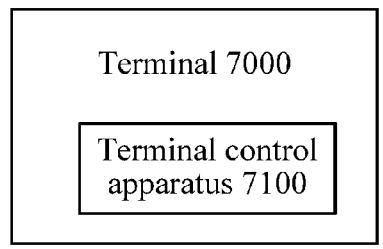
FIG. 52 is a schematic block diagram of a terminal according to an embodiment of the present disclosure.

As shown in FIG. 52, an embodiment of the present disclosure further provide a terminal 7000, and the terminal 7000 includes a terminal control apparatus 7100 according to an embodiment of the present disclosure. The terminal control apparatus 7100 includes an obtaining module (not shown) and a performing module (not shown). The obtaining module is configured to obtain terminal information of a terminal 7000, where the terminal information includes position distribution of a terminal held position on the terminal 7000, or includes the position distribution and a terminal posture of the terminal 7000, or includes the position distribution and a current use status of the terminal 7000, or includes the position distribution, the terminal posture and the use status. The performing module is configured to perform, according to a mapping relationship between terminal information and a terminal control operation, an operation corresponding to the terminal information in order to control the terminal 7000.

It should be understood that, in this embodiment of the present disclosure, the terminal information may only include the position distribution of the terminal held position on the terminal 7000, may also include the position distribution and the terminal posture of the terminal 7000, may also include the position distribution and the current use status of the terminal 7000, and may also include the position distribution, the terminal posture and the use status.

It should be further understood that, in this embodiment of the present disclosure, the mapping relationship between the terminal information and the terminal control operation may be a mapping relationship between position distribution and a terminal control operation, may also be a mapping relationship between position distribution in combination with a terminal posture of the terminal 7000 and a terminal control operation, may also be a mapping relationship between position distribution in combination with a current use status of the terminal 7000 and a terminal control operation, and may also be a mapping relationship between position distribution in combination with a terminal posture, a use status and a terminal control operation.

It should be understood that, in addition to the terminal control apparatus 7100, the terminal 7000 may further include another apparatus or module, such as a display apparatus, a photographing module, a voice module and/or a processing module.

It should be further understood that, the terminal control apparatus 7100 included in the terminal 7000 according to this embodiment of the present disclosure may be corresponding to the apparatuses 1000 to 6000 for controlling a terminal according to the embodiments of the present disclosure, and the foregoing and other operations and/or functions of the modules in the terminal control apparatus 7100 are used to implement corresponding processes of the methods in FIG. 1 to FIG. 27 respectively, and for simplicity, details are not repeated herein.

Therefore, in a terminal 7000 according to this embodiment of the present disclosure, terminal information is obtained, intention of a user about controlling the terminal 7000 can be determined proactively according to a mapping relationship between terminal information and a terminal control operation, and an operation corresponding to the terminal information may be performed, thereby improving intelligence and automation levels of controlling a terminal, and improving user experience.

Figure 53:
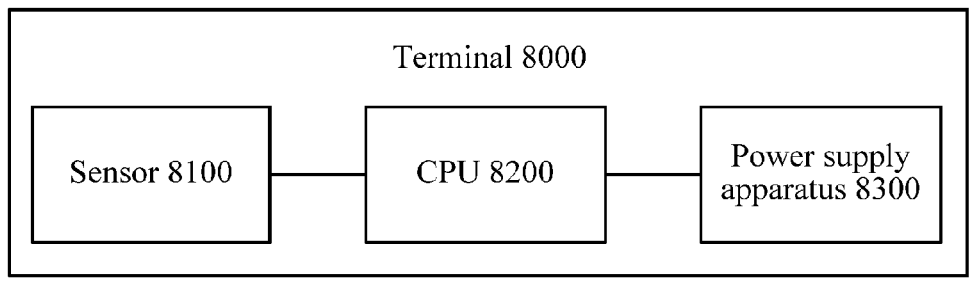
FIG. 53 is a schematic block diagram of a terminal according to another embodiment of the present disclosure.

FIG. 53 is a schematic block diagram of a terminal 8000 according to an embodiment of the present disclosure. As shown in FIG. 53, the terminal 8000 includes a sensor 8100 configured to obtain terminal information of a terminal, where the terminal information includes position distribution of a terminal held position on the terminal 8000, or includes the position distribution and a terminal posture of the terminal 8000, or includes the position distribution and a current use status of the terminal 8000, or includes the position distribution, the terminal posture and the use status, a CPU 8200 configured to perform, according to a mapping relationship between terminal information and a terminal control operation, an operation corresponding to the terminal information obtained by the sensor 8100 in order to control the terminal 8000, and a power supply apparatus 8300 configured to supply power to the terminal 8000.

In this embodiment of the present disclosure, optionally, the CPU 8200 is further configured to establish the mapping relationship between the terminal information and a terminal control operation, and perform, according to the established mapping relationship and the terminal information, the operation corresponding to the terminal information in order to control the terminal 8000.

It should be understood that, the sensor 8100 may include a resistive sensor, a capacitive sensor, an inductive sensor, a pressure sensor, a piezoelectric sensor, or the like, and can sense or detect the terminal information according to a touch sensing technology and/or pressure sensing technology when a user holds the terminal. For example, the sensor 8100 may include one or more of sensors such as a resistive sensor, a capacitive sensor, an inductive sensor, a pressure sensor, a piezoelectric sensor, an optical sensor, a gyroscope, and an acceleration sensor.

It should be understood that, the CPU 8200 may further be configured to implement corresponding processes of the methods in FIG. 1 to FIG. 27, and for simplicity, details are not repeated herein.

It should be understood that, in this embodiment of the present disclosure, the terminal information may only include the position distribution of the terminal held position on the terminal 8000, may also include the position distribution and the terminal posture of the terminal 8000, may also include the position distribution and the current use status of the terminal 8000, and may also include the position distribution, the terminal posture and the use status.

It should be further understood that, in this embodiment of the present disclosure, the mapping relationship between the terminal information and the terminal control operation may be a mapping relationship between position distribution and a terminal control operation, may also be a mapping relationship between position distribution in combination with a terminal posture of the terminal 8000 and a terminal control operation, may also be a mapping relationship between position distribution in combination with a current use status of the terminal 8000 and a terminal control operation, and may also be a mapping relationship between position distribution in combination with a terminal posture, a use status and a terminal control operation.

It should be understood that, the terminal 8000 may further include another apparatus or module, such as a display apparatus, a photographing module, a voice module and/or a processing module.

It should be further understood that, the terminal 8000 according to this embodiment of the present disclosure may be corresponding to the apparatuses 1000 to 6000 for controlling a terminal according to the embodiments of the present disclosure, and the foregoing and other operations and/or functions of the modules in the apparatus 8000 are used to implement corresponding processes of the methods in FIG. 1 to FIG. 27 respectively, and for simplicity, details are not repeated herein.

Therefore, in a terminal 8000 according to this embodiment of the present disclosure, terminal information is obtained, intention of a user about controlling the terminal 8000 can be determined proactively according to a mapping relationship between terminal information and a terminal control operation, and an operation corresponding to the terminal information may be performed, thereby improving intelligence and automation levels of controlling a terminal, and improving user experience.

It should be further understood that, in this embodiment of the present disclosure, the terminal control apparatus may be a control unit or a control module integrated in the terminal 8000, that is, the terminal 8000 may include the apparatus. Certainly, the terminal control apparatus may also be a separate control device capable of communicating with the terminal 8000. This embodiment of the present disclosure is not limited thereto.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A terminal control method, comprising:
    obtaining a first position distribution of a terminal held position on a terminal;
    obtaining a first use status of the terminal;
    performing, according to a mapping relationship between the first position distribution in combination with the first use status and an operation of answering an incoming call, the operation of answering the incoming call when the first use status is an incoming call state and the first position distribution is a call operation position distribution;
    obtaining a second position distribution of the terminal held position on the terminal;
    obtaining a second use status of the terminal; and
    performing, according to a mapping relationship between the second position distribution in combination with the second use status and a mute operation, the mute operation when the second use status is the incoming call state and the second position distribution is a disposition operation position distribution.

2. The method according to claim 1, further comprising establishing the mapping relationship between the first position distribution in combination with the first use status and the operation of answering the incoming call.

3. The method according to claim 2, wherein establishing the mapping relationship between the first position distribution in combination with the first use status and the operation of answering the incoming call comprises:
    prompting a user to collect, in a current use status of the terminal, a representative position distribution corresponding to the operation of answering the incoming call;
    determining that the user holds the terminal in a customary manner corresponding to the operation of answering the incoming call;
    recording the representative position distribution of the terminal held position on the terminal and the current use status of the terminal; and
    establishing, according to the representative position distribution and the current use status, the mapping relationship between the first position distribution in combination with the first use status and the operation of answering the incoming call.

4. The method according to claim 1, further comprising:
    obtaining an operation currently performed by the terminal when a currently obtained position distribution and a current use status do not match the mapping relationship; and generating, according to the currently obtained position distribution, the current use status and the operation currently performed by the terminal, a new mapping relationship between the currently obtained position distribution in combination with the current use status and the operation currently performed by the terminal.

5. The method according to claim 1, further comprising:
prompting a user that the terminal is about to perform the operation of answering the incoming call; and
performing the operation of answering the incoming call after the user confirms the operation.

6. The method according to claim 1, further comprising:
obtaining a third position distribution of the terminal held position on the terminal;
obtaining a third use status of the terminal; and
performing, according to a mapping relationship between the third position distribution in combination with the third use status and an operation of opening a new message, the operation of opening the new message when the third use status is a new message arriving state and the third position distribution is a browsing operation position distribution.

7. The method according to claim 6, further comprising:
obtaining a fourth position distribution of the terminal held position on the terminal;
obtaining a fourth use status of the terminal; and
performing, according to a mapping relationship between the fourth position distribution in combination with the fourth use status and an operation of calling a sender of the new message, the operation of calling a sender of the new message when the fourth use status is the new message arriving state and the fourth position distribution is the call operation position distribution.

8. The method according to claim 7, further comprising:
obtaining a fifth position distribution of the terminal held position on the terminal;
obtaining a fifth use status of the terminal;
performing, according to a mapping relationship between the fifth position distribution in combination with the fifth use status and a photographing operation, the photographing operation when the fifth use status is a message editing state and the fifth position distribution is a photographing operation position distribution;
obtaining a sixth position distribution of the terminal held position on the terminal;
obtaining a sixth use status of the terminal;
performing, according to a mapping relationship between the sixth position distribution in combination with the sixth use status and an operation of inserting a take picture into a message being currently edited, the operation of inserting the taken picture into the message being currently edited when the sixth use status is the message editing state and the sixth position distribution is the photographing operation position distribution;
obtaining a seventh position distribution of the terminal held position on the terminal;
obtaining a seventh use status of the terminal;
performing, according to a mapping relationship between the seventh position distribution in combination with the seventh use status and an operation of calling a receiver of the message being currently edited, the operation of calling the receiver of the message being currently edited when the seventh use status is the message editing state and the seventh position distribution is the call operation position distribution.

9. The method according to claim 1, further comprising performing a power-saving operation when an eighth position distribution is an idle operation position distribution.

10. The method according to claim 1, wherein the disposition operation position distribution corresponds to a palm of a user facing a front side of a screen of the terminal.

11. The method according to claim 1, further comprising performing a power-saving operation when an eighth position distribution is an idle operation position distribution, wherein a body of the terminal faces downwards in the idle operation position distribution.

12. A terminal control apparatus, comprising:
a memory comprising instructions; and
a processor coupled to the memory, wherein the instructions, when executed by the processor, cause the processor to:
 obtain position distribution of a terminal held position on a terminal;
 obtain a current use status of the terminal; and
 perform, according to a mapping relationship between position distribution in combination with a use status and a terminal control operation, an operation corresponding to the position distribution and the use status in order to control the terminal, and
wherein when performing the operation corresponding to the position distribution and the use status in order to control the terminal, the instructions further cause the processor to be configured to:
 perform a power-saving operation when the position distribution is an idle operation position distribution;
 perform an operation of answering an incoming call when the use status is an incoming call state and the position distribution is a call operation position distribution;
 perform a mute operation when the use status is the incoming call state and the position distribution is a disposition operation position distribution;
 perform an operation of opening a new message when the use status is a new message arriving state and the position distribution is a browsing operation position distribution;
 perform an operation of calling a sender of the new message when the use status is the new message arriving state and the position distribution is the call operation position distribution;
 perform a photographing operation when the use status is a message editing state and the position distribution is a photographing operation position distribution;
 insert a taken picture into a message being currently edited when the use status is the message editing state and the position distribution is the photographing operation position distribution; and
 perform an operation of calling a receiver of the message being currently edited when the use status is the message editing state and the position distribution is the call operation position distribution.

13. The apparatus according to claim 12, wherein the instructions, when executed by the processor, further cause the processor to:
establish the mapping relationship between the position distribution in combination with the use status and the terminal control operation; and
perform, according to the established mapping relationship, the position distribution and the use status, the operation corresponding to the position distribution and the use status in order to control the terminal.

14. The apparatus according to claim 13, wherein the instructions, when executed by the processor, further cause the processor to:
- prompt a user to collect, in the current use status of the terminal and the position distribution corresponding to the terminal control operation;
- determine that the user holds the terminal in a customary manner corresponding to the terminal control operation;
- record the position distribution of the terminal held position on the terminal and the current use status of the terminal; and
- establish, according to the position distribution and the use status, the mapping relationship between the position distribution in combination with the use status and the terminal control operation.

15. The apparatus according to claim 12, wherein the instructions, when executed by the processor, further cause the processor to:
- obtain an operation performed by the terminal when the position distribution and the use status do not match the mapping relationship; and
- update, according to the position distribution, the use status and the operation, the mapping relationship between the position distribution in combination with the use status and the terminal control operation.

16. The apparatus according to claim 12, wherein the instructions, when executed by the processor, further cause the processor to:
- determine, according to the mapping relationship between the position distribution in combination with the use status and the terminal control operation, the operation corresponding to the position distribution and the use status;
- prompt a user that the terminal is about to perform the operation; and
- perform the operation to control the terminal after the user confirms the operation.

17. The apparatus according to claim 12, wherein the position distribution comprises the browsing operation position distribution.

18. The apparatus according to claim 12, wherein the position distribution comprises the call operation position distribution.

19. The apparatus according to claim 12, wherein the position distribution comprises the photographing operation position distribution.

20. The apparatus according to claim 12, wherein the position distribution comprises the idle operation position distribution or disposition operation position distribution.

* * * * *

UNITED STATES PATENT AND TRADEMARK OFFICE
CERTIFICATE OF CORRECTION

PATENT NO. : 10,075,582 B2
APPLICATION NO. : 15/460353
DATED : September 11, 2018
INVENTOR(S) : Xiaojun Xie et al.

Page 1 of 1

It is certified that error appears in the above-identified patent and that said Letters Patent is hereby corrected as shown below:

In the Claims

Column 47, Line 50, Claim 8 should read:
sixth use status and an operation of inserting a taken Signed and Sealed this
Twenty-third Day of October, 2018

Andrei Iancu
*Director of the United States Patent and Trademark Office*